US008164804B2

(12) United States Patent
Tanaka et al.

(10) Patent No.: US 8,164,804 B2
(45) Date of Patent: Apr. 24, 2012

(54) IMAGE READING APPARATUS, IMAGE READING UNIT THEREOF, AND REFERENCE MEMBER THEREOF FOR SHADING CORRECTION

(75) Inventors: Jun Tanaka, Chichibu (JP); Takashi Machida, Niiza (JP); Shinobu Kato, Yokohama (JP); Keiji Tsutaoka, Tokyo (JP); Taketo Ochiai, Tokyo (JP); Tetsurou Ishikawa, Tokyo (JP)

(73) Assignee: Canon Denshi Kabushiki Kaisha, Saitama-Ken (JP)

( * ) Notice: Subject to any disclaimer, the term of this patent is extended or adjusted under 35 U.S.C. 154(b) by 0 days.

(21) Appl. No.: 13/163,646

(22) Filed: Jun. 17, 2011

(65) Prior Publication Data

US 2011/0249302 A1    Oct. 13, 2011

Related U.S. Application Data

(63) Continuation of application No. 11/689,115, filed on Mar. 21, 2007.

(30) Foreign Application Priority Data

Mar. 22, 2006  (JP) .............................. 2006-079434
Mar. 22, 2006  (JP) .............................. 2006-079437
Sep. 15, 2006  (JP) .............................. 2006-251041

(51) Int. Cl.
*H04N 1/04*    (2006.01)
*H04N 1/40*    (2006.01)

(52) U.S. Cl. ........................................ 358/474; 358/461

(58) Field of Classification Search ................. 358/1.1, 358/1.9, 3.26, 461, 463, 474, 497, 498, 505, 358/514, 521; 382/100, 167, 254, 274; 399/207, 399/367
See application file for complete search history.

(56) References Cited

U.S. PATENT DOCUMENTS

| 4,539,482 | A | 9/1985 | Nose ........................ 250/208.1 |
| 4,825,295 | A | 4/1989 | Ishikawa et al. ............. 358/254 |
| 4,831,455 | A | 5/1989 | Ishikawa et al. ............. 358/229 |
| 4,939,580 | A | 7/1990 | Ishikawa et al. ............. 358/229 |
| 5,475,504 | A | 12/1995 | Ogura et al. ................ 358/474 |
| 5,621,544 | A | 4/1997 | Ogura et al. ................ 358/494 |
| 6,892,945 | B2 * | 5/2005 | Shishido ..................... 235/454 |
| 6,989,915 | B2 | 1/2006 | Honjo et al. ................. 358/461 |
| 7,139,108 | B2 * | 11/2006 | Andersen et al. ............. 358/474 |
| 2002/0039208 | A1 | 4/2002 | Honjo et al. ................. 358/514 |

(Continued)

FOREIGN PATENT DOCUMENTS

JP    62-098861    5/1987

(Continued)

*Primary Examiner* — Gabriel Garcia
(74) *Attorney, Agent, or Firm* — Fitzpatrick, Cella, Harper & Scinto

(57) ABSTRACT

An image reading apparatus which is capable of performing accurate shading correction with simple arrangement while preventing a reference member from being scratched and preventing paper powder and the like dust from being deposited on the reference member. The image reading apparatus includes an image reading unit in which a contact glass guides an original on an image reading location. The contact glass is held by a glass holding member. A line image sensor reads the image on the original conveyed on the image reading location, through the contact glass. The image reading unit further includes a reference member whose image is readable by the image sensor, and a moving mechanism to move the image sensor so as to enable the image sensor to alternatively read the original and a reference surface of the reference member.

8 Claims, 18 Drawing Sheets

U.S. PATENT DOCUMENTS

| | | | |
|---|---|---|---|
| 2004/0179242 A1 | 9/2004 | Nakaya | 358/461 |
| 2005/0157351 A1 | 7/2005 | Matsuda | 358/474 |
| 2005/0179954 A1 | 8/2005 | Arai et al. | 358/3.26 |
| 2005/0206968 A1 | 9/2005 | Sodeura et al. | 358/474 |
| 2006/0193015 A1 | 8/2006 | Machida | 358/474 |
| 2007/0223062 A1 | 9/2007 | Tanaka et al. | 358/497 |

FOREIGN PATENT DOCUMENTS

| | | |
|---|---|---|
| JP | 62-183258 | 8/1987 |
| JP | 64-010771 | 1/1989 |
| JP | 1-300760 | 12/1989 |
| JP | 1-307364 | 12/1989 |
| JP | 1-321769 | 12/1989 |
| JP | 3-094568 | 4/1991 |
| JP | 3-69964 U | 7/1991 |
| JP | 5-7278 | 1/1993 |
| JP | 5-183691 | 7/1993 |
| JP | 9-307695 | 11/1997 |
| JP | 10-304195 | 11/1998 |
| JP | 11-258869 | 9/1999 |
| JP | 11-289424 | 10/1999 |
| JP | 2001-066713 | 3/2001 |
| JP | 2001-094739 | 4/2001 |
| JP | 2001-160893 | 6/2001 |
| JP | 2001-313781 | 11/2001 |
| JP | 2002-101266 | 4/2002 |
| JP | 2002-320075 | 10/2002 |
| JP | 2004-364180 | 12/2004 |
| JP | 2005-102017 | 4/2005 |
| JP | 2005-129986 | 5/2005 |

* cited by examiner

IMAGE READING APPARATUS, IMAGE READING UNIT THEREOF, AND REFERENCE MEMBER THEREOF FOR SHADING CORRECTION

This application is a continuation of U.S. application Ser. No. 11/689,115, filed Mar. 21, 2007, the contents of which are incorporated herein by reference.

BACKGROUND OF THE INVENTION

1. Field of the Invention

The present invention relates to an image reading apparatus configured to read an image formed on an original, while conveying the original, an image reading unit thereof, and a reference member thereof for shading correction.

2. Description of the Related Art

In general, in an image reading apparatus configured to read an image formed on an original, while conveying the original, the original is illuminated with light from a light source, and reflected light from the original is focused by a rod lens array or the like, whereby the image on the original is read e.g. by a line image sensor. However, due to variations in the amounts of light from the light source and the variations in the performance of the rod lens array and variations in the sensitivity of the line image sensor, it is impossible to perform uniform image reading without any correction.

To enable uniform image reading, image data obtained from an output signal from the line image sensor when an original image is read is corrected using shading correction data formed based on an output signal from the line image sensor obtained when a white reference member is read. When correction data for use in the correction is captured, light amount adjustment for optimizing the amount of light emitted from the light source to illuminate an original, and gain adjustment for optimizing an amplification factor for amplifying image signal output from the line image sensor are carried out. Further, it is a general practice to perform shading correction for correcting the variations in the amounts of light from the light source and the variations in the performance of the rod lens array and the variations in the sensitivity of the line image sensor in association with each pixel thereof. Hereafter, the correction including the light amount adjustment and the gain adjustment performed so as to enable the line image sensor to uniformly read image information from the original will be referred to as "shading correction".

In an image reading apparatus of the above-mentioned type, a member disposed in an original image reading position where the line image sensor reads an image on an original, for supporting a conveyed original from the reverse side of the same original has a color (black in general) other than white for the purpose of detection of a boundary between the original image and the background image, detection of a skew-feeding of the original, and prevention of lack of hiding of a reverse side image of the original.

A description will be given of the schematic arrangement and operation of a conventional typical image reading apparatus with reference to FIG. 22.

The image reading apparatus 1000 shown in FIG. 22 is configured to read image information on an original D by a line image sensor 110 through a contact glass 150 while conveying the original D. The image reading apparatus 1000 includes a pickup roller 2 for picking up originals D, a feed roller 3 for feeding the originals D picked up by the pickup roller 2, a retard roller 4 for separating the picked-up originals D one from another, and a registration roller pair 5 and a convey roller pair 7 each formed by a pair of rollers disposed at respective opposed locations, for conveying the originals D.

First, before reading an image on an original D, the image reading apparatus 1000 moves the line image sensor 110 in a direction indicated by an arrow S in FIG. 18 and causes the line image sensor 110 to read a reference member 170. The reference member 170 is disposed at a location opposed to the line image sensor 110 having been moved in the direction indicated by the arrow S.

Then, image data obtained based on an output from the line image sensor 110 when the line image sensor 110 has read the reference member 170 is stored, as shading correction data for shading correction, in association with each pixel of the line image sensor 110. Thereafter, the image reading apparatus 1000 returns the line image sensor 110 to its original position (original image reading position), and causes the line image sensor 110 to read the image on the original D, while conveying the original D. During the operation for reading the original D, the image data obtained from the output of the line image sensor 110 is corrected by shading correction performed with reference to the correction data stored in advance. It should be noted that whether or not the line image sensor 110 has been moved to a reference member reading position for reading the reference member 170 can be determined based on an output from a position sensor 120. The position sensor 120 is a means for detecting the position of the line image sensor 110.

In the image reading apparatus 1000 configured as above, if the line image sensor 110 deviates from the exact original image reading position when the line image sensor 110 returns from the reference member reading position to the original image reading position, registration error occurs in original reading. This registration error is generally prevented by positioning the line image sensor 110 using the position sensor 120. The above-described sequential operation is commonly performed in response to an instruction from a control means, such as a CPU (Control Processing Unit).

Some image reading apparatuses are configured such that not a line image sensor but a reference member is moved between original reading position and escape position. For example, a technique has been proposed in which the reference member is exposed into an original conveying path during a period of reference member reading, and is retracted to a position where the reference member does not contact with a conveyed original, during a period of original reading (see e.g. Japanese Laid-Open Patent Publication (Kokai) No. 2005-102017).

Conventionally, the reference member is disposed on the far side of the original conveying path from the line image sensor, at a location which enables the line image sensor to read the reference member.

However, in the above-described prior art, paper powder and the like dust comes to stay between the reference member and the line image sensor as originals are conveyed, to make the reference member soiled, which can often hinder accurate shading correction. In such a case, a shading mechanism originally configured to correct the variations in the sensitivity of the line image sensor and the variations in the amount of light emitted from the light source and the variations in the performance of the lens array cannot operate accurately, causing variations in color and brightness in a read image. This is a serious problem for an image forming apparatus.

For this reason, when accurate shading correction cannot be performed on images due to the above-mentioned soiling, a first countermeasure is conventionally taken in which a user cleans the reference member, and then reading is resumed.

Further, a second countermeasure has conventionally been proposed in which the reference member is disposed at a location which does not face the original conveying path and where dust and dirt are difficult to attach, and the reference member is moved to a reading position of the line image sensor when acquisition of shading correction data is performed using the line image sensor (see e.g. Japanese Laid-Open Patent Publications (Kokai) No. H10-304195 and No. 2005-102017).

A conventional image reading apparatus of another type has an image reading unit which causes the line image sensor 110 to slidably move in a direction parallel to the contact glass 150 thereby enable the reading position of the image sensor to move between the original reading position and the reference member reading position. This type of image reading apparatus reads image information from an original D by the line image sensor 110 through the contact glass 150 while conveying the original D in a direction indicated by an arrow 'a' in FIG. 23. During this operation, a light source incorporated in the line image sensor 110 illuminate the original D through the contact glass 150. First, before starting the reading of the original D, the image reading apparatus moves the line image sensor 110 in a direction indicated by an arrow b in FIG. 23, and causes the same to read a surface (reference surface), which faces the contact glass 150, of the reference member 170. Then, the image reading apparatus generates shading correction data for use in shading correction, based on a signal output from the line image sensor 110 having read the reference surface, and stores the generated shading correction data on a pixel-by-pixel basis.

Thereafter, the image reading apparatus returns the line image sensor 110 to its original position to read the image on the original D while conveying the original D in the direction of the arrow a. During this image reading operation, the image reading apparatus performs shading correction on image data generated based on an output signal from the line image sensor 110, by referring to the shading correction data stored in advance.

The reference member 170 used here is implemented e.g. by a white film formed by silk printing or the like.

Japanese Laid-Open Patent Publication (Kokai) No. S62-098861 discloses a flat bed scanner which uses the aforementioned white film as the reference member.

The image reading apparatus disclosed in Japanese Laid-Open Patent Publication (Kokai) No. 2005-102017 is advantageous in that originals do not rub against the reference member during conveyance, and hence the reference member is difficult to be scratched or soiled. However, paper powder produced and wafted during an original conveying period can be deposited on the reference member, which necessitates periodic cleaning of the reference member. In addition, since paper powder is very fine, it is difficult to remove the paper powder deposited on the reference member completely. Further, a mechanism for causing the reference member to be exposed to the original conveying path is necessitated, which can cause an increase in the number of component parts and make the construction of the apparatus complicated.

On the other hand, in the conventional image reading apparatus shown in FIG. 22, since an original D rubs against the reference member 170 during conveyance, the reference member 170 can be scratched, or dust, such as paper powder and swarf from rollers, can be attached to the reference member 170. Therefore, if shading correction is performed with reference to the reference member 170 deprived of whiteness by being scratched or soiled, lines or streaks appear on read original images.

Insofar as the first countermeasure is concerned, image degradation due to maladjustment of shading correction cannot be recognized until the read image is viewed. For this reason, in a case where a large number of originals are continuously read, it is difficult to recognize image degradation at an early stage of the reading operation, and it is only after a long time that the reading operation is restarted. Further, the user has to clean the reference member manually, which is a nuisance to the user.

On the other hand, in the case of the second countermeasure, a traveling path along which the reference member extends continuous with the original conveying path and a standby location of the reference member, and hence a tiny amount of dust, such as paper powder, produced by conveyance of originals can enter the traveling path and stay thereon. In this case, there is a fear that the reference member moved into the original conveying path for shading correction might be soiled by the remaining dust.

Further, white films formed by coating (painting or printing) are liable to differ in thickness between individual units thereof, and even an individual white film is apt to have variation in thickness depending on the location thereon. The use of such a white film as a white reference leads to a single image which is partially degraded due to partial degradation of the image reading performance or occurrence of an image reading apparatus degraded in image reading performance.

SUMMARY OF THE INVENTION

The present invention provides an image reading apparatus which is capable of performing accurate shading correction with simple arrangement while preventing a reference member from being scratched and paper powder and the like dust from being deposited on the reference member, and an image reading unit thereof, as well as a shading correction reference member thereof.

In a first aspect of the present invention, there is provided an image reading apparatus configured to read an image formed on an original, while conveying the original along a conveying path, comprising an image reading unit including a contact glass configured to guide an original to an image reading location, a glass holding member configured to hold the contact glass, an image sensor configured to read an image on an original conveyed to the image reading location, through the contact glass, a reference member whose image is readable by the image sensor, and a moving mechanism configured to move the image sensor so as to enable the image sensor to alternatively read the original conveyed on the image reading location and the reference member, wherein arrangement of the image sensor and the reference member is so designed as to make the reference surface of said reference member isolated from the conveying path.

With the arrangement of the first aspect of the present invention, the image sensor and the reference member are arranged such that the reference surface of the reference member is isolated from the conveying path. More specifically, the reference member is provided on the original conveying path-side surface of the contact glass. Further, the reference surface of the reference member is held in close contact with the contact glass. As a consequence, it is possible to perform accurate shading correction with the simple arrangement while preventing the reference member from being scratched and paper powder and the like dust from being attached to the reference member.

The reference surface of the reference member can be held in close contact with the contact glass.

The reference member can be disposed on the glass holding member.

With the arrangement of this embodiment, the reference member can be disposed on the glass holding member. As a consequence, in a state isolated from the conveying path, the reference surface of the reference member can be protected from being soiled by paper powder and the like dust. Therefore, it is possible to perform accurate shading correction and dispense with cleaning of the reference member.

In a second aspect of the present invention, there is provided an image reading apparatus configured to read an image formed on an original, while conveying the original along a conveying path, comprising an image reading unit including a contact glass configured to guide an original to an image reading location, a glass holding member configured to hold the contact glass, an image sensor configured to read an image on an original conveyed to the image reading location, through the contact glass, a reference member whose image is readable by the image sensor, and a moving mechanism configured to relatively move the image sensor and the reference member so as to enable the image sensor to alternatively read the original conveyed to the image reading location and the reference member, wherein arrangement of the image sensor and the reference member is so designed as to make the reference surface isolated from the conveying path, and the reference member is disposed on an original conveying path-side surface of the contact glass.

With the arrangement of the second aspect of the present invention, it is possible to obtain the same advantageous effects as provided by the first aspect of the invention.

In a third aspect of the present invention, there is provided an image reading apparatus configured to read an image formed on an original, while conveying the original along a conveying path, comprising an image reading unit including a contact glass configured to guide an original to an image reading location, a glass holding member configured to hold the contact glass, an image sensor configured to read an image on an original conveyed to the image reading location, through the contact glass, a reference member whose image is readable by the image sensor, and a moving mechanism configured to relatively move the image sensor and the reference member so as to enable the image sensor to alternatively read the original conveyed on the image reading location and the reference member, wherein arrangement of the image sensor and the reference member is so designed as to make the reference surface isolated from the conveying path, and the reference member is fixed to an opposite surface of the contact glass from an original conveying path-side surface thereof.

With the arrangement of the third aspect of the invention, the reference member is fixed to the opposite surface of the contact glass from the original conveying path-side surface thereof. As a consequence, in a state isolated from the conveying path, the reference surface of the reference member is protected from being soiled by paper powder and the like dust. Therefore, it is possible to perform accurate shading correction and dispense with cleaning of the reference member.

In a fourth aspect of the present invention, there is provided an image reading apparatus configured to read an image formed on an original, while conveying the original along a conveying path, comprising an image reading unit including a contact glass configured to guide an original to an image reading location, a glass holding member configured to hold the contact glass, an image sensor configured to read an image on an original conveyed to the image reading location, through the contact glass, a reference member whose image is readable by the image sensor, and a moving mechanism configured to relatively move the image sensor and the reference member so as to enable the image sensor to alternatively read the original conveyed on the image reading location and the reference member, wherein the reference member comprises a white coating film formed on an original conveying path-side surface of the contact glass, and a protective member covering at least a portion of the white coating film, for protection of the white coating film.

With the arrangement of the fourth aspect of the present invention, it is possible to obtain the same advantageous effects as provided by the first aspect of the invention.

In a fifth aspect of the present invention, there is provided an image reading apparatus configured to read an image formed on an original, comprising an image reading unit including a frame that has an opening formed in an original conveying path side thereof, and rotatably supports a pivot shaft of an image sensor housed in the frame, a contact glass disposed on the opening of the frame, configured to guide the original to an image reading location thereon, and a reference member disposed within the frame.

With the arrangement of the fifth aspect of the present invention, the image reading unit provided in the image reading apparatus includes a frame that has an opening formed in an original conveying path side thereof, and rotatably supports a pivot shaft of an image sensor housed in the frame, a contact glass disposed on the opening of the frame, for guiding the original to an image reading location thereon, and a reference member disposed within the frame. Therefore, it is possible to prevent paper powder and the like dust attached to the upper surface of the contact glass i.e. attached to originals being conveyed out of the frame from entering the frame and from attaching to the white reference member. Thus, accurate shading correction can be achieved without necessitating cleaning of the reference member.

In a sixth aspect of the present invention, there is provided an image reading unit provided in the image reading apparatus according to the fifth aspect of the present invention.

With the arrangement of the sixth aspect of the present invention, it is possible to obtain the same advantageous effects as provided by the first aspect of the invention.

In a seventh aspect of the present invention, there is provided an image reading apparatus for reading an image formed on an original, while conveying the original, comprising a contact glass configured to have an original conveying surface on which an original reading position and a reference member reading position exist, and guide the original on the original conveying surface, an image sensor configured to be capable of moving a reading position thereof between the original reading position and the reference member reading position, and read the image formed on the original guided on the original conveying surface, through the contact glass, and a shading correction reference member as a white reference for the image sensor, wherein the shading correction reference member comprises a white coating film formed on an original conveying path-side surface of the contact glass, and a protective member covering at least a portion of the white coating film, for protection of the white coating film.

With the arrangement of the seventh aspect of the present invention, the reference member is formed by affixing the protective member, such as a white tape, to the white coating film, so that even if the thickness of the white coating film formed by painting or printing method is not uniform, the protective member, such as a white tape, or the two-sided tape for affixing the protective member to the white coating film functions like a back light to reflect light having passed through the white coating film, which makes it possible to maintain uniform whiteness of the reference member, as viewed through the contact glass. This enhances accuracy in shading correction, and therefore it is possible to maintain stable image reading performance. Further, the white coating film does not require high hardness and is allowed to have a non-uniform thickness, so that it is possible to form the white coating film by an inexpensive method. The protective member suffices if only it can reflect light having passed through the white coating film, and is not required to be formed high dimensional accuracy. When a durable protective member formed e.g. of metal is used, it is not necessary to carry out replacement of the protective member, which provides an image reading apparatus that is easy to manufacture and maintain.

The protective member can be a substantially white adhesive tape.

The protective member can be substantially white, and the shading correction reference member can have a transparent fixing member provided between the protective member and the white coating film, for fixing the protective member to a surface of the white coating film.

The shading correction reference member can have a substantially white fixing member provided between the protective member and the white coating film, for fixing the protective member to a surface of the white coating film.

The shading correction reference member has a two-sided adhesive tape for fixing the protective member, in a manner opposed to the white coating film, to at least one of a portion of the white coating film and a portion of the contact glass other than a portion close to the reference member reading location.

The fixing member can be a two-sided adhesive tape.

The fixing member can be an adhesive.

The protective member can be a sheet form member.

The protective member is a sheet metal member.

In an eighth aspect of the present invention, there is provided a shading correction reference member disposed at a reference member reading location on a contact glass provided in an image reading apparatus, comprising a white coating film formed on an original conveying path-side surface of the contact glass, and a protective member covering at least a portion of the white coating film, for protection of the white coating film.

With the arrangement of the eighth aspect of the present invention, it is possible to obtain the same advantageous effects as provided by the seventh aspect of the invention.

The above and other objects, features and advantages of the invention will become apparent from the following detailed description taken in conjunction with the accompanying drawings.

BRIEF DESCRIPTION OF THE DRAWINGS

FIGS. 3A and 3B are cross-sectional views of an image reading unit appearing in FIG. 1, in a state during an original reading period, in which:
FIG. 3A shows the image reading unit as viewed vertically; and
FIG. 3B shows the image reading unit as viewed horizontally.

FIGS. 4A and 4B are cross-sectional views of the image reading unit in a state during a reference member reading period, in which:
FIG. 4A shows the image reading unit as viewed vertically; and
FIG. 4B shows the image reading unit as viewed horizontally.

FIGS. 5A and 5B are views of a drive section appearing in FIG. 1 and component parts associated therewith as viewed from above, in which:
FIG. 5A shows a state during the original reading period; and
FIG. 5B shows a state during the reference member reading period.

FIGS. 6A and 6B are views of the drive section and component parts associated therewith, as viewed in an original conveying direction, in which:
FIG. 6A shows a state in which the apparatus is closed during the original reading period; and
FIG. 6B shows a state in which the apparatus is open during the reference member reading period.

FIGS. 8A and 8B are partial vertical cross-sectional views showing another example of the image reading unit, in which:
FIG. 8A shows a state during the original reading period; and
FIG. 8B shows a state during the reference member reading period.

FIGS. 9A and 9B are partial vertical cross-sectional views showing still another example of the image reading unit, in which:
FIG. 9A shows a state during the original reading period; and
FIG. 9B shows a state during the reference member reading period.

FIGS. 10A to 10D are partial cross-sectional views showing an example of the layout of a reference member, in which:
FIG. 10A shows a case where the reference member is disposed on an opposite surface of a contact glass from an original conveying surface thereof;
FIG. 10B shows a case where the reference member is disposed on an original conveying surface of a glass holding member;
FIG. 10C shows a case where the reference member is disposed on an opposite surface of the glass holding member from the original conveying surface thereof; and
FIG. 10D shows a case where a junction part is omitted from the layout shown in FIG. 10B.

FIGS. 15A and 15B are cross-sectional views showing the image reading unit and its surrounding, in which:
FIG. 15A shows a state during the original reading period; and
FIG. 15B shows a state during a shading correction data acquisition period.

FIGS. 18A and 18B are cross-sectional views showing the image reading unit according to a variation and its surrounding, in which:
FIG. 18A shows a state during the original reading period; and FIG. 18B shows a state during the shading correction data acquisition period.

DETAILED DESCRIPTION OF THE PREFERRED EMBODIMENTS

The present invention will now be described in detail with reference to the drawings showing preferred embodiments thereof. It should be noted that the relative arrangement of the components, the numerical expressions and numerical values set forth in these embodiments do not limit the scope of the present invention unless it is specifically stated otherwise.

Figure 1:
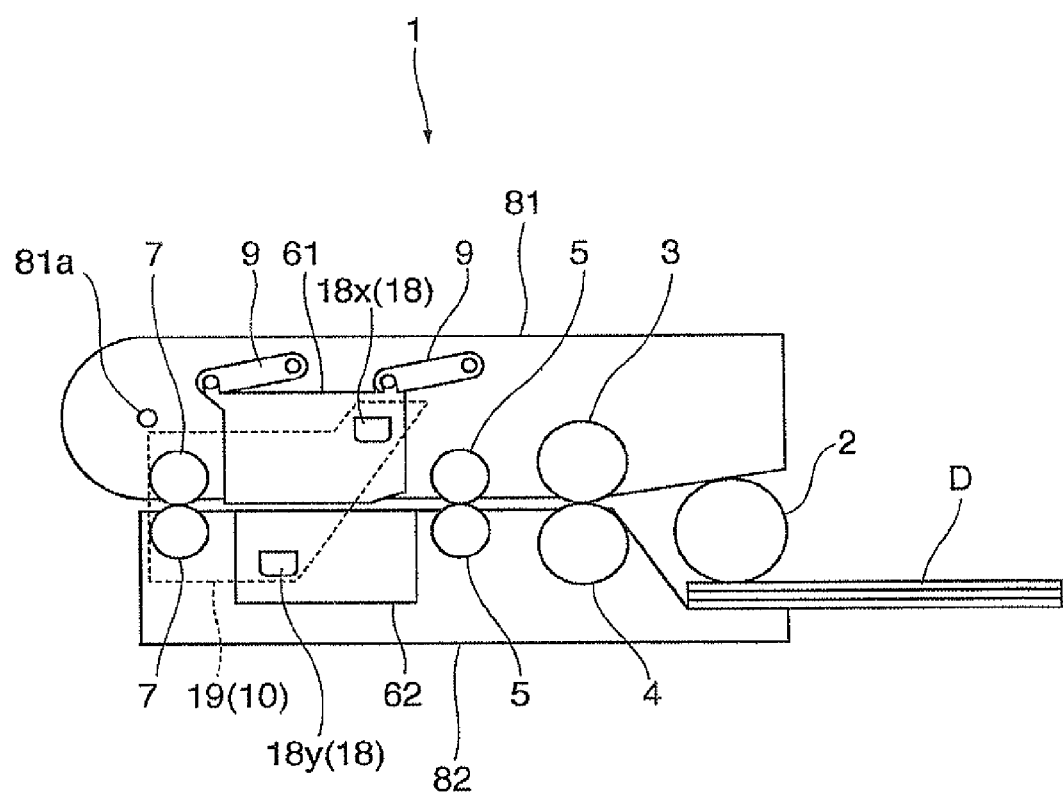
FIG. 1 is a schematic side cross-sectional view showing the internal construction of an image reading apparatus according to a first embodiment of the present invention.

FIG. 1 is a schematic side cross-sectional view showing the internal construction of an image reading apparatus according to a first embodiment of the present invention. The arrangement of the image reading apparatus shown in FIG. 1 is given only by way of example, but it is not limitative.

As shown in FIG. 1, the image reading apparatus 1 is comprised of a pickup roller 2 that picks up originals D, a feed roller 3 that feeds the originals D picked up by the pickup roller 2 into the apparatus 1, a retard roller 4 that separates the picked-up originals D one by one, a pair of registration rollers 5 disposed at respective locations opposed to each other for conveying an original D, an image reading unit 61 that reads image information on the upper surface (surface on a front side) of each original D conveyed by the registration roller pair 5, an image reading unit 62 that reads image information on the lower surface (surface on a reverse side) of each conveyed original D, and a pair of convey rollers 7 disposed at respective locations downstream of the image reading units 61 and 62 in a manner opposed to each other for conveying the original D.

The image reading apparatus 1 has an upper frame 81 pivotally movable about a pivot shaft 81a and a lower frame 82 supporting the pivot shaft 81a, and coveys the original D through a space enclosed by the upper frame 81 and the lower frame 82. The upper frame 81 can be turned (opened/closed) manually so as to allow an original D conveyed and jammed in the apparatus 1 to be removed from the apparatus 1.

The upper frame 81 accommodates the feed roller 3, one of the registration rollers 5, the image reading unit 61, and one of the convey rollers 7, while the lower frame 82 accommodates the retard roller 4, the other one of the registration rollers 5, the image reading unit 62, and the other one of the convey rollers 7. Portions (not shown) supporting the pivot shaft 81a are integrally formed with the lower frame 82, and extend from the respective sides (toward and away from the viewer viewing FIG. 1) in a manner sandwiching the upper frame 81.

The image reading unit 62 is fixed to the lower frame 82. On the other hand, the image reading unit 61 is movably supported on the upper frame 81 by a plurality of swing arms 9. Each of the swing arms 9 has one end thereof supported on the upper frame 81, and the other end thereof supported on the image reading unit 61. This makes the image reading unit 61 vertically movable, so that reading of an image on a thick original and conveyance of the thick original can be performed smoothly. The one end of each swing arm 9 has a snap-fit structure, which facilitates assembly.

A driving unit 10 is comprised of a drive mechanism and a drive motor accommodated in the vicinity of the portions of the lower frame 82 supporting the pivot shaft 81a, for driving the protruding portions 18x and 18y of the respective slide cams 18 that protrude from the side surfaces of the respective image reading units 61 and 62 in the same direction (toward the viewer as viewed in FIG. 1). The pushing member 19 presses the protruding portions 18x and 18y to drive these, whereby the image reading units 61 and 62 are each switched from a state during the original reading period to a state during the reference member reading period.

Next, a description will be given of a sequence of operations carried out by the image reading apparatus 1 for reading an image on an original D.

First, the pushing member 19 as one of component parts forming the driving unit 10 is caused to press the protruding portions 18x and 18y to thereby cause the respective image reading units 61 and 62 to move to the position where the reference members, referred to hereinafter, are read by the line image sensors, respectively. The image reading apparatus 1 generates shading correction data, based on reading signals obtained by the reading, and stores the generated shading correction data on a pixel-by-pixel basis. Thereafter, pressing of the protruding portions 18x and 18y by the pushing member 19 is stopped, and then originals D are fed into the apparatus 1 by the pickup roller 2 and the feed roller 3 and are separated one by one by the retard roller 4.

While being nipped and conveyed (in a sub-scanning direction) by the registration roller pair 5 and the convey roller pair 7, each original D is repeatedly scanned by the image reading units 61 and 62 in a main scanning direction (i.e. in a direction substantially orthogonal to the original conveying direction), whereby images on the respective upper and lower surfaces of the original D are read. It should be noted that during the original reading period, image data generated based on an output signal from the line image sensor of each of the image reading units 61 and 62 is subjected to shading correction with reference to the stored shading correction data. After the images are read, the original D is nipped and conveyed by the convey roller pair 7 and discharged out of the apparatus 1. Generation and storage of the shading correction data may be performed once for all loaded originals D at the start of reading operation or may be repeatedly performed for every several originals D.

Figure 2:
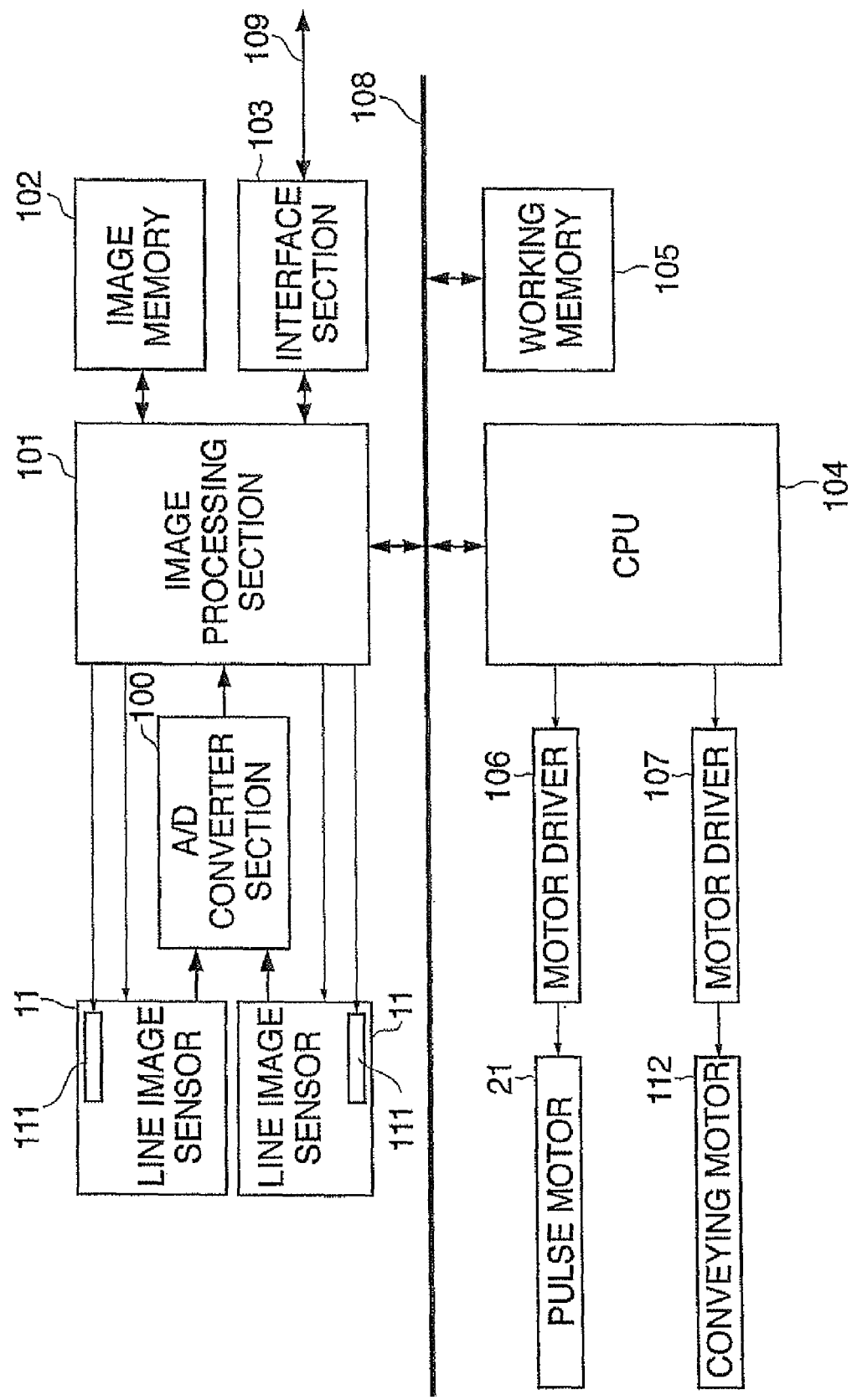
FIG. 2 is a schematic block diagram showing the electrical configuration of the image reading apparatus in FIG. 1.

FIG. 2 is a schematic block diagram showing the electrical configuration of the image reading apparatus 1 in FIG. 1.

In FIG. 2, reference numeral 11 designates the line image sensor (image sensor) provided in each of the image reading units 61 and 62. Reference numeral 111 designates a light source incorporated in the line image sensor 11.

Reference numeral 100 designates an A/D converter section that performs analog processing, such as amplification and black level clamp, on the image signals received from the respective line image sensors 11 and then A/D converts the signals. Reference numeral 101 designates an image processing section that controls the line image sensors 11, the light sources 111, the A/D converter section 100, and so forth, and performs various kinds of image processing (including shading correction) on image data obtained by A/D conversion of the image signals.

Reference numeral 102 designates an image storage section (image memory) that stores image data. Reference numeral 103 designates an interface section that connects the image processing section 101 to an external host apparatus, a network, and so forth via a signal line 109. Reference numeral 104 designates a control section (CPU) that controls the overall operation of the image reading apparatus 1. Reference numeral 105 designates a storage section (working memory) used by the CPU 104 for operation.

The image processing section 101, the CPU 104, and the working memory 105 are interconnected by a bus 108. The CPU 104 is configured to be able to access the image memory 102 via the image processing section 101. Therefore, the CPU 104 can perform processing using image data stored in the image memory 102, according to a program written in the working memory 105.

Reference numeral 112 designates a conveying motor for conveying originals D. The conveying motor 112 operates under the control of a motor driver 107 responsive to an instruction from the CPU 104. A pulse motor 21 is one of the component parts forming the driving unit 10. The pulse motor 21 causes rotating motion of the pushing member 19 to thereby slide the slide cam 18, whereby each of the line image sensors 11 is moved between an original image reading position for reading an image on an original D and a reference member reading position for reading the reference member. The pulse motor 21 operates under the control of a motor driver 106 responsive to an instruction from the CPU 104.

Next, the arrangement of the image reading unit 62 appearing in FIG. 1 will be described with reference to FIGS. 3A and 3B and FIGS. 4A and 4B.

Figure 3A:
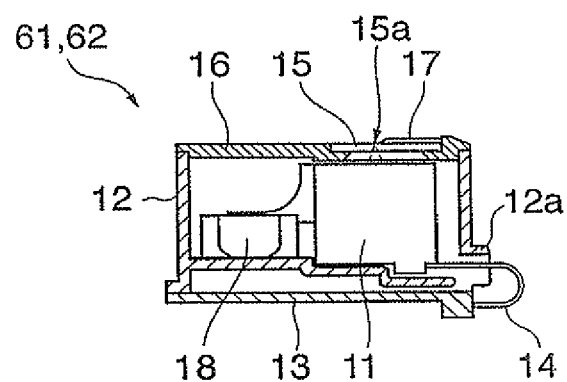
Figure 3B:
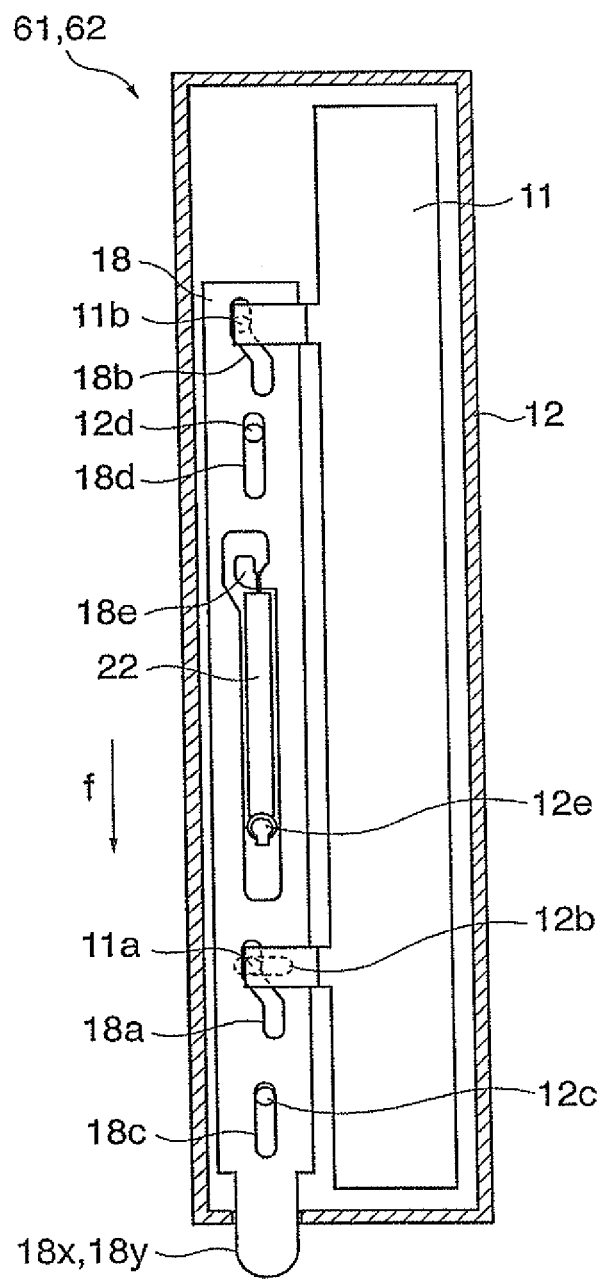
Figure 4A:
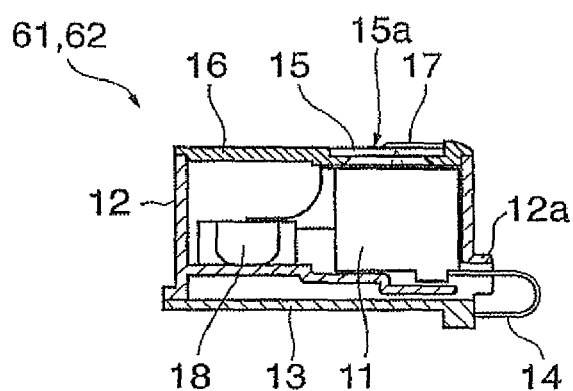
Figure 4B:
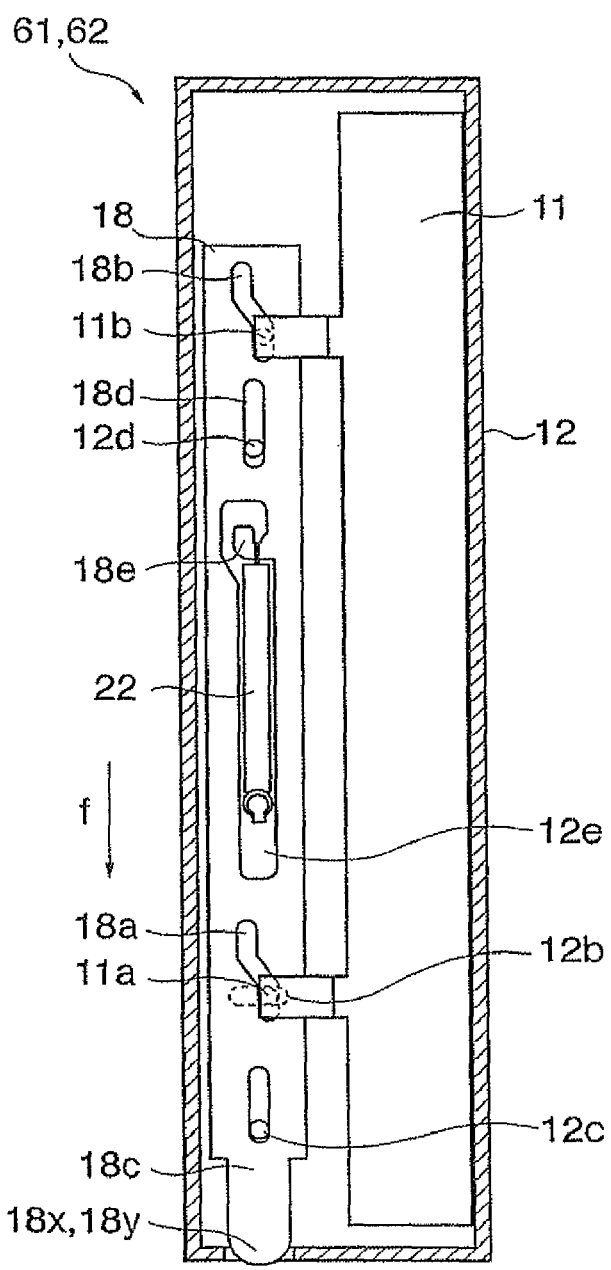

FIG. 3A is a vertical partial cross-sectional view of the image reading unit 62 during the original reading period, while FIG. 3B is a horizontal partial cross-sectional view of the same. FIG. 4A is a vertical partial cross-sectional view of the image reading unit 62 during the reference member reading period, while FIG. 4B is a horizontal partial cross-sectional view of the same. The image reading unit 61 and the image reading unit 62 are identical in construction, and hence a description will be given of the image reading unit 62 alone.

As shown in FIGS. 3A and 3B and FIGS. 4A and 4B, the image reading unit 62 is comprised of the line image sensor 11 that reads images, a frame 12 that accommodates the line image sensor 11, a printed circuit board 13 that causes the line image sensor 11 to operate, a flat cable 14 that connects between the line image sensor 11 and the printed circuit board 13, a contact glass 15 that guides an original D to an original image reading location 15a, a glass holding member 16 that holds the contact glass 15, the reference member 17 having a white reference surface, the slide cam 18 that moves the line image sensor 11 to a predetermined position, and a tension spring 22 that urges the slide cam 18 to return the line image sensor 11 from the predetermined position to its home position.

As shown in FIGS. 3A and 4A, the frame 12 is formed with a through hole 12a through which the flat cable 14 extends. The through hole 12a is formed to have an eaves shape so as to prevent the entry of dirt and dust.

The reference member 17 is disposed on the original conveying surface of the contact glass 15 at a location different from the original image reading location 15a. The white reference lower surface of the reference member 17, as a portion close to the location corresponding to the reference member reading position, is held in intimate contact with the contact glass 15 by bonding, adhesion using an adhesive tape, or any other suitable method. Alternatively, the reference member 17 may be formed on the contact glass 15 by coating (painting or printing). Therefore, the white reference surface is prevented from being damaged even when a conveyed original D rubs against the reference member 17, or from losing whiteness due to attachment of paper powder or dirt thereto.

The line image sensor 11 has protrusions 11a and 11b each protruding rearward as viewed in FIG. 3B. The protrusion 11a is fitted in a cam groove 18a formed in the slide cam 18. Further, the protrusion 11a is fitted through an elongated hole 12b formed in the frame 12, whereby the movement of the line image sensor 11 in the main scanning direction is restricted. On the other hand, the protrusion 11b is fitted in a cam groove 18b also formed in the slide cam 18.

The slide cam 18 is formed with the cam grooves 18a and 18b in which the protrusions 11a and 11b are fitted, respectively, elongated holes 18c and 18d in which protrusions 12c and 12d protruding from the frame 12 are fitted, respectively, and a hook part 18e to which the tension spring 22 is hooked.

The slide cam 18 is under tension by the tension spring 22 held on a holding part 12e of the frame 12 by the tension spring 22 under tension acting in a direction indicated by an arrow f in FIGS. 3B and 4B. During the original reading period, as shown in FIG. 3B, the protruding portion 18y as one end of the slide cam 18 (the protruding portion 18x in the case of the image reading unit 61) is held in a state protruding from the frame 12. On the other hand, during the reference member reading period, as shown in FIG. 4B, the protruding portion 18y as one end of the slide cam 18 (the protruding portion 18x in the case of the image reading unit 61) is held in a state retracted in the frame 12 of the image reading units 62.

The slide cam 18 is thus slidably engaged with the line image sensor 11, and is driven in the main scanning direction i.e. the longitudinal direction of the line image sensor 11, whereby the line image sensor 11 can be moved according to the shapes of the cam grooves 18a and 18b in the sub scanning direction to one of the original image reading position and the reference member reading position.

Next, the arrangement of the driving unit 10 appearing in FIG. 1 will be described with reference to FIGS. 5A and 5B and FIGS. 6A and 6B.

Figure 5A:
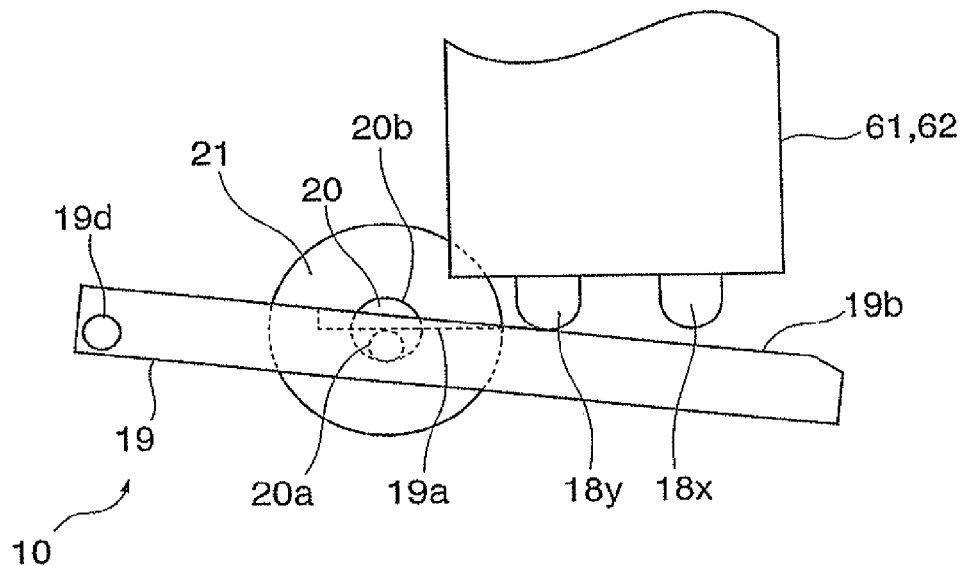
Figure 5B:
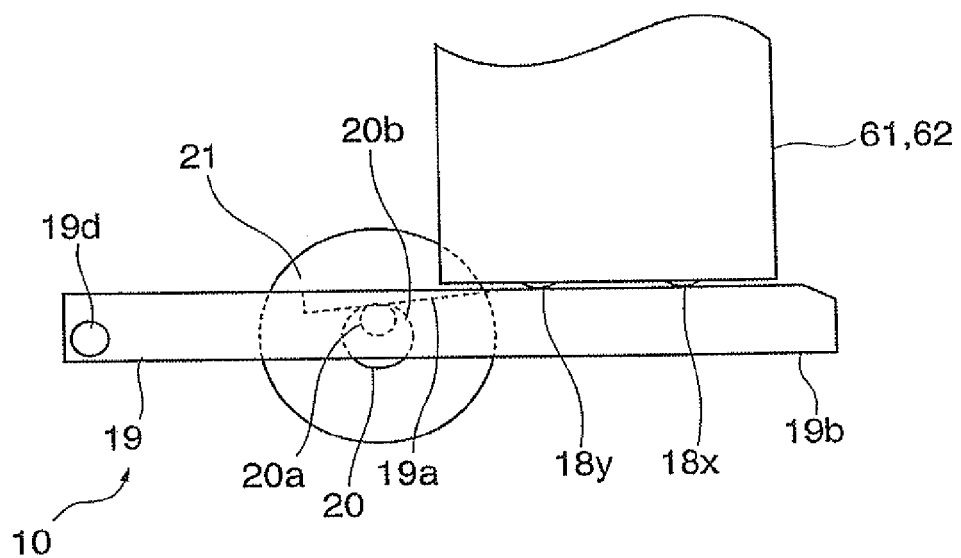

FIGS. 5A and 5B are views of the driving unit 10 and component parts associated therewith, as viewed from above, in which FIG. 5A shows a state during the original reading period, and FIG. 5B shows a state during the reference member reading period.

As shown in FIGS. 5A and 5B, the protruding portion 18x is an end portion of the slide cam 18 protruding from a side surface of the image reading unit 62, and the protruding portion 18y is an end portion of the slide cam 18 protruding from a side surface of the image reading unit 61.

The driving unit 10 is comprised of the pushing member 19 for pushing in the protruding portions 18x and 18y, an eccentric cam 20 for transmitting a driving force to the pushing member 19, and the pulse motor 21 for rotating the eccentric cam 20 about a pivot shaft 20b to actuate the pushing member 19.

The pushing member 19 has a contact surface 19a held in contact with an eccentric cylindrical surface 20a of the eccentric cam 20, and the contact surface 19b for being brought into contact with the protruding portions 18x and 18y. The pushing member 19 is configured such that the contact surface 19a held in contact with the eccentric cylindrical surface 20a is pushed by the rotation of the eccentric cam 20 about the axis of the pivot shaft 20b and is rotated about the axis of the pivot shaft 19d. When the pushing member 19 is rotated about the pivot 19d, the ends of the slide cams 18 (protruding portions 18x and 18y) are protruded from the respective image reading units 61 and 62 and/or are pressed into the image reading units 61 and 62, respectively.

The image reading unit 61 and the image reading unit 62 are arranged such that the protruding portion 18x of the image reading unit 61 is positioned farther from the pivot 19d than the protruding portion 18y of image reading unit 62 so as to make a difference between the distance from the pivot 19d to the protruding portion 18x and that from the pivot 19d to the protruding portion 18y. Since the image reading units 61 and 62 are thus positioned, during the original reading period, the pushing member 19 is brought into contact with the protruding portion 18y as shown in FIG. 5A, but on the other hand, the contact surface 19b is kept from contact with the protruding portion 18x. As a consequence, the image reading unit 61 movably supported by the swing arms 9 is allowed to vertically move smoothly in accordance with the varying thickness of originals.

Figure 6A:
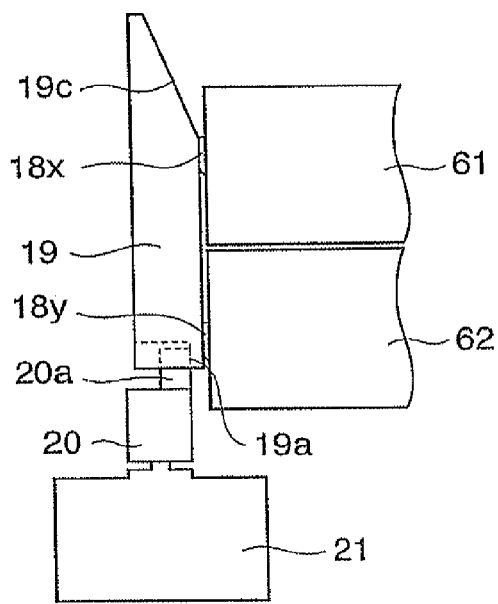
Figure 6B:
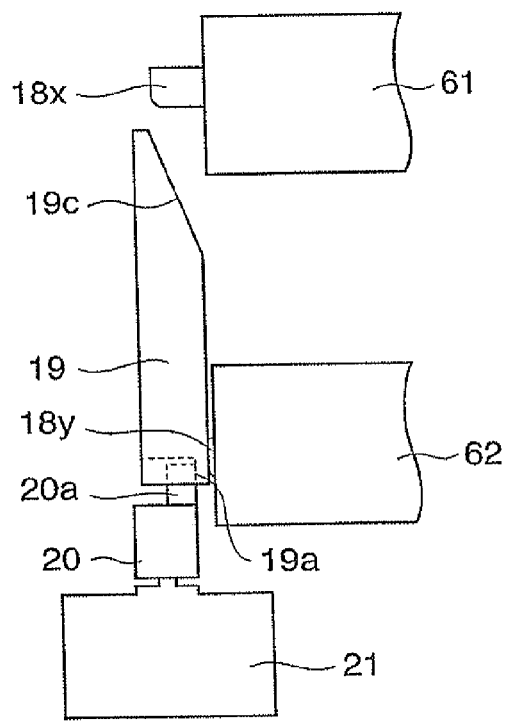

FIGS. 6A and 6B are views of the driving unit 10 and component parts associated therewith, as viewed in the original conveying direction, in which FIG. 6A shows a state in which the apparatus 1 is in closed state during the reference member reading period, and FIG. 6B shows a state in which the apparatus 1 is opened during the reference member reading period.

The state where the apparatus 1 is closed is defined as a state in which the upper frame 81 and the lower frame 82 are held in meeting contact with each other as shown in FIG. 1 and the original conveying passage can normally function. On the other hand, the state where the apparatus 1 is open is defined as a state in which the upper frame 81 is in a lifted position by being turned upward around the pivot shaft 81a, whereby the conveying passage is kept open for cleaning.

As shown in FIGS. 6A and 6B, the pushing member 19 has a sloping surface part 19c formed on a contact portion thereof facing toward the image reading units 61 and 62, and for contact with the protruding portion 18x. When the apparatus 1 is opened during the reference member reading period, since the slide cam 18 is under tension by the tension spring 22, the protruding portion 18x pressed in by the pushing member 19 protrudes from the image reading unit 61 in a state freed from the pressing force of the pushing member 19. When the apparatus 1 is closed in this state, there is a fear that the protruding portion 18x and the pushing member 19 collides with each other, causing breakage, unless the sloping surface part 19c is not formed on the pushing member 19.

However, according to the present embodiment, since the pushing member 19 is formed with the sloping surface part 19c, the protruding portion 18x protruding from the image reading unit 61 is pressed in by being brought into abutment with the sloping surface part 19c during the process of closing the apparatus 1, which makes it possible to prevent breakage due to collision between the protruding portion 18x and the pushing member 19. It should be noted that by forming the end of the protruding portion 18x for contact with the sloping surface part 19c to have a round shape (angle R), it is possible to further enhance the effect of preventing breakage due to collision between the protruding portion 18x and the pushing member 19.

With this arrangement, the image reading apparatus 1 can drive the slide cams 18 of the respective two image reading units 61 and 62 by the single driving unit 10. This eliminates the need for providing each of the two image reading units 61 and 62 with a motor for driving the associated image reading unit and a driving force-transmitting mechanism associated with the motor. As a consequence, a space required for arranging the motor and the driving force-transmitting mechanism can be reduced to thereby achieve reduction of the size of the apparatus 1. Further, it is possible to make the number of component parts of the apparatus 1 smaller than that of the conventional apparatus, thereby reducing the price of the apparatus 1.

Furthermore, the slide cams 18 can be externally driven from outside the respective image reading units 61 and 62 to thereby shift the position of the associated line image sensor 11, so that in a case where the image reading apparatus is a single-sided reading apparatus, it is possible to form the apparatus 1 by the upper frame 81 accommodating an image reading unit and the lower frame 82 without an image reading unit, and provide the driving unit 10 in the lower frame 82. Thus, the degree of freedom in configuration of the apparatus 1 can be enhanced.

Next, an operation for detecting an operation starting position of the pulse motor 21 will be described with reference to FIG. 7.

Figure 7:
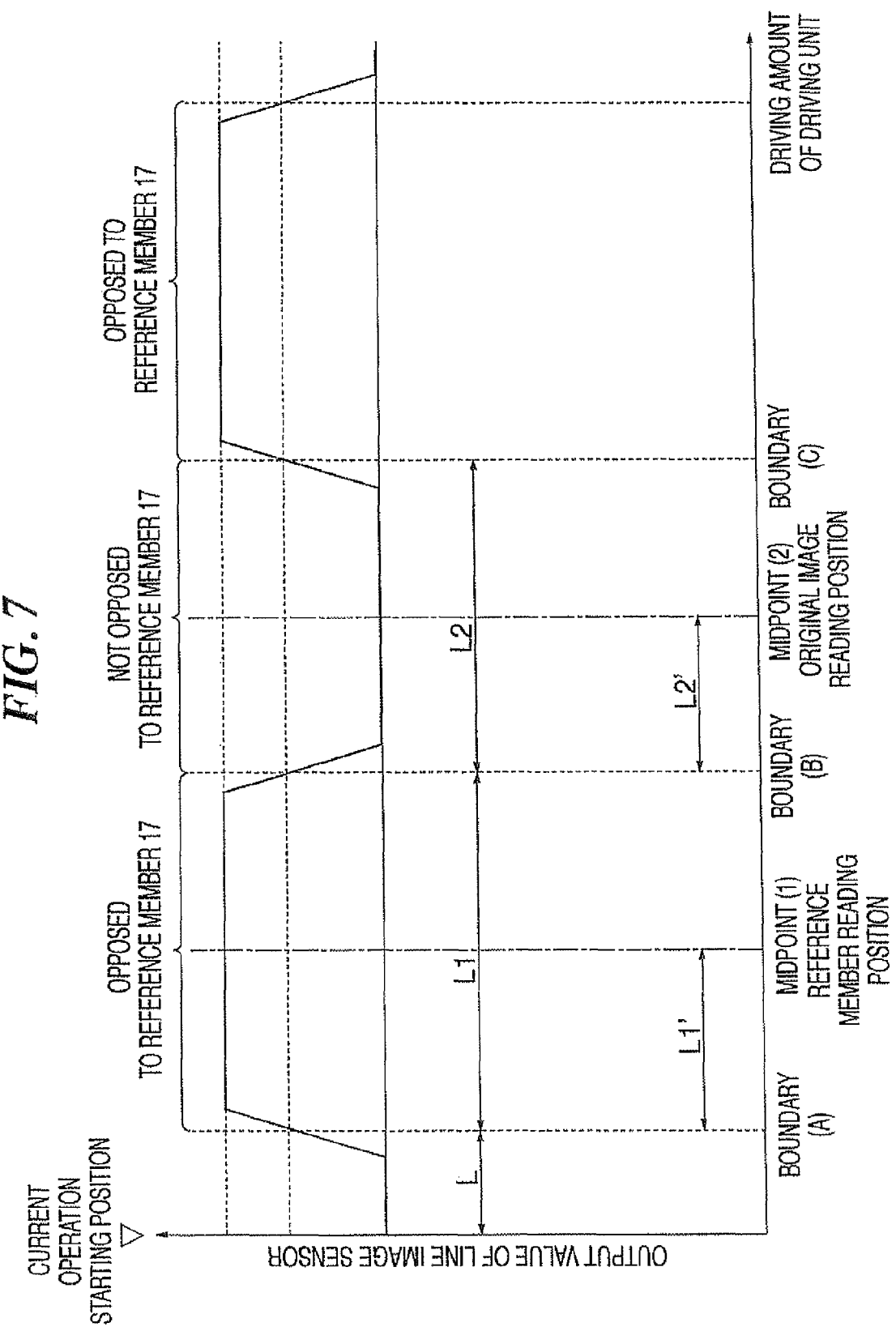
FIG. 7 is a diagram showing an output waveform obtained when an image reading operation is performed by a line image sensor while a pulse motor is rotated at a constant speed.

FIG. 7 is a diagram showing an output waveform obtained when an image reading operation is performed by the line image sensor 11 while the pulse motor 21 is rotated at a constant speed. Specifically, the diagram shows changes in the output value common to light-receiving elements of the line image sensor 11 with respect to the number of steps of the pulse motor 21 (driving amount of the driving unit 10) counted when an image reading operation is performed by the line image sensor 11 while rotating the pulse motor 21 at a constant speed.

As the pulse motor 21 is caused to perform one rotation, the line image sensor 11 moves from the position not opposed to the reference member 17 as shown in FIG. 3A to a position opposed to the reference member 17 as shown in FIG. 4A, and then returns to the position not opposed to the reference member 17 as shown in FIG. 3A. In the meantime, a reading operation is performed by the line image sensor 11, and the line image sensor output value as shown in FIG. 7 is stored in the image memory 102. The line image sensor output value is obtained by converting the line image sensor output as an analog signal into digital data by the A/D converter section 100 and then subjecting the digital data to offset correction.

The CPU 104 performs processing for detecting a boundary between image data obtained by reading the reference member 17 in the position opposed to the reference member 17 and image data read in the position not opposed to the reference member 17, from the image data stored in the image memory 102. The CPU 104 stores information on which pulse of the pulse motor 21 corresponds to the detected boundary, and calculates a desirable stop position, whereby it is possible to know the number of steps of the pulse motor 21 required for moving the line image sensor 11 from the current operation starting position to the original image reading position or the reference member reading position. This step count is equal to the driving amount of the driving unit 10.

A midpoint (1) between a boundary (A) detected when the line image sensor 11 has moved from a position not opposed to the reference member 17 as shown in FIG. 3A to a position opposed to the reference member 17 as shown in FIG. 4A and a boundary (B) detected when the line image sensor 11 has moved from the position opposed to the reference member 17 to a position which ceases to be opposed to the reference member 17 as shown in FIG. 3A can be regarded as an optimum position for causing the line image sensor 11 to be opposed to the reference member 17.

On the other hand, a midpoint (2) between the boundary (B) detected when the line image sensor 11 has moved from the position opposed to the reference member 17 as shown in FIG. 4A to the position not opposed to the reference member 17 as shown in FIG. 3A and a boundary (C) detected when the line image sensor 11 has moved from the position not opposed to the reference member 17 to the position opposed to the reference member 17 as shown in FIG. 4A can be regarded as an optimum position for causing the line image sensor 11 to be not opposed to the reference member 17.

However, the size of the reference member 17 varies with each image reading apparatus 1. Further, since the reading position of the line image sensor 11 is moved by the pulse motor 21 via the pushing member 19 and the slide cam 18, the distance of travel of the line image sensor 11 varies.

To detect the optimum positions, the reading operation is performed while rotating the pulse motor 21 at a constant speed, and driving amounts L1 and L2 of the pulse motor 21 required for moving the line image sensor 11 between the boundaries are each determined as respective step counts based on the changes in the output value shown in FIG. 7. Thus, driving amounts L+L1' and L+L1+L2' of the pulse motor 21 required for moving the line image sensor 11 from the current operation starting position of the pulse motor 21 to the positions corresponding to the respective midpoints (1) and (2) can be each determined as respective step counts.

As described above, it is possible to calculate the driving amount for moving the line image sensor 11 to the midpoint (1) as a driving amount for positioning the line image sensor 11 for the reference member reading operation and the driving amount for moving the line image sensor 11 to the midpoint (2) as a driving amount for positioning the line image sensor 11 for the original image reading operation, respectively. This eliminates the need for additionally providing a position sensor for detecting the operation starting position of the line image sensor 11.

Even when the line image sensor 11 is moved to the position not opposed to the reference member 17, if an original D or the like exists on the contact glass 15, the difference in brightness between the surface of the original D and that of the reference member 17 becomes so small that the boundaries cannot be detected. Therefore, in this case, an error message may be displayed to instruct or urge a user to remove the original D.

By the way, immediately after the power of the image reading apparatus 1 is turned on, it is impossible to recognize the current stop position of the pulse motor 21. This means that the position of the line image sensor 11 cannot be determined. For this reason, neither the light amount adjustment of the light source nor the gain adjustment of the A/D converter section 100 can be performed at this time point.

Therefore, in the operation for searching for the boundaries detected when the line image sensor 11 passing over an area including a portion opposed to the reference member 17 and a portion not opposed to the reference member 17, a light amount set value of the light source, a gain set value of the A/D converter section 100, and the shading correction data are each set to a preset initial value (particularly suitably, immediately after assembling the apparatus 1 in a factory, for example). In discriminating between a scan image read at "the optimum position for causing the line image sensor 11 to be opposed to the reference member 17 (the midpoint (1))" as mentioned above (hereinafter referred to as "the scan image from the reference member 17") and a scan image read at "the other optimum position for causing the line image sensor 11 to be not opposed to the reference member 17 (the midpoint (2))" as mentioned above (hereinafter referred to as "the scan image from the portion other than reference member 17"), a method of utilizing the difference in magnitude between an output from the line image sensor 11 and a predetermined threshold value can be exemplified as an easy method to employ.

However, the influence of variation in the amount of light from the light source or the like can make it impossible to discriminate between the scan image from the reference member 17 and that from the portion other than the reference member 17 using the preset initial values or the predetermined threshold value. In such a case, it is possible to employ a method of storing the maximum and minimum values of the output from the line image sensor 11 during one rotation of the pulse motor 21, and setting the average value of the maximum and minimum values to the threshold value, or a method of changing the light amount set value of the light source and the gain set value of the A/D converter section 100 such that discrimination between the scan image from the reference member 17 and that from the portion other than the reference member 17 can be performed based on a predetermined threshold value. The gain set value may be changed by adjusting an amplifier that amplifies an analog signal before A/D conversion, or by computing digital data after A/D conversion.

With the above-described arrangement, during the reference member reading period before execution of the image reading operation, the image reading apparatus 1 rotates the pulse motor 21 to bring the pushing member 19 and the slide cam 18 into the state shown in FIG. 5B, thereby moving the line image sensor 11 to the position opposed to the reference member 17 (see FIG. 4A). Then, when the line image sensor 11 and the reference member 17 are opposed to each other such that the reading effective range of the line image sensor 11 is covered by the reference member 17, the line image sensor 11 reads the reference member 17. As a consequence, correction data generated based on the output from the line image sensor 11 is stored on a pixel-by-pixel basis, as shading correction data for use in shading correction. Thereafter, the image reading apparatus 1 rotates the pulse motor 21 to bring the pushing member 19 and the slide cam 18 into the state shown in FIG. 5A, thereby moving the line image sensor 11 to the position not opposed to the reference member 17 (see FIG. 3A).

According to the above-described embodiment, the line image sensor 11 and the reference member 17 are arranged such that the reference surface of the reference member 17 is isolated from the conveying path for originals D. More specifically, the reference member 17 is disposed on the original conveying surface of the contact glass 15, with the reference surface thereof held in intimate contact with the contact glass 15. This prevents the reference surface from being scratched, and prevents deposition of paper powder or the like, which obviates the necessity of cleaning the reference member 17. This makes it possible to acquire shading correction data without suffering from degradation of the whiteness of the reference surface, and perform shading correction with accuracy.

Figure 8A:
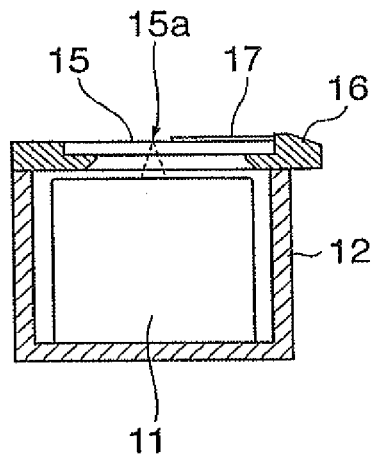
Figure 8B:
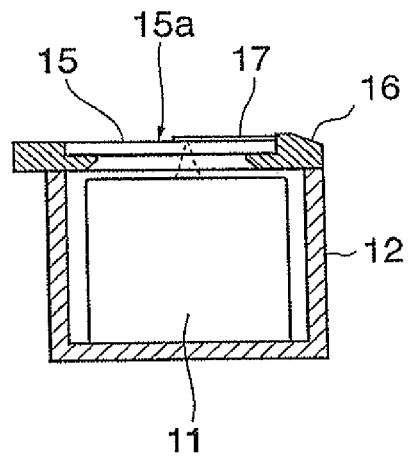
Figure 9A:
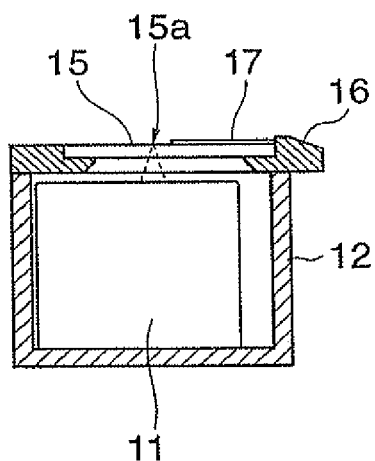
Figure 9B:
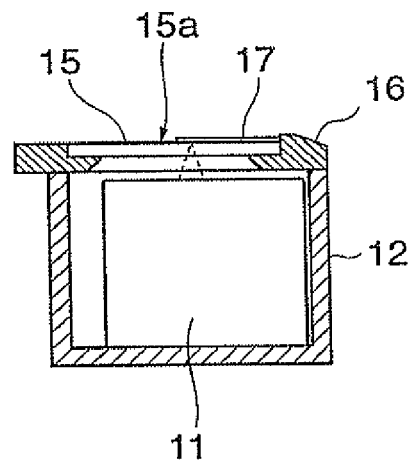

Although in the above-described embodiment, only the line image sensor 11 is moved, this is not limitative. More specifically, the line image sensor 11 and the glass holding member 16 may be relatively moved to thereby shift the line image sensor 11 between the position opposed to the reference member 17 and the position not opposed to the reference member 17. For example, the image reading unit may be configured such that only the glass holding member 16 is moved during a transition period between the original reading period shown in FIG. 8A and the reference member reading period shown in FIG. 8B, or alternatively such that the line image sensor 11 and the glass holding member 16 are both moved during the transition period between the original reading period shown in FIG. 9A and the reference member reading period shown in FIG. 9B.

Figure 10A:
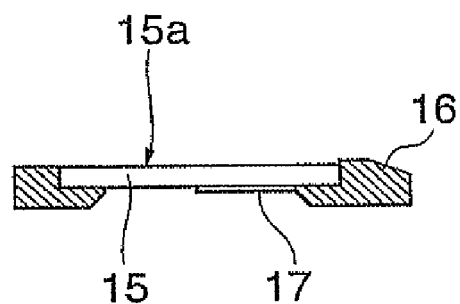
Figure 10B:
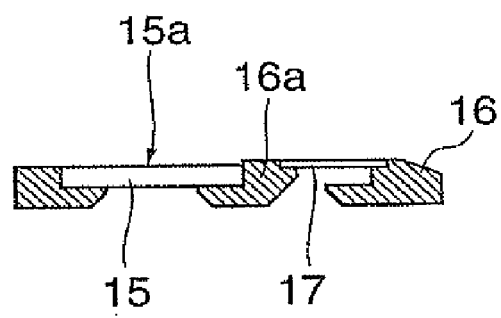
Figure 10C:
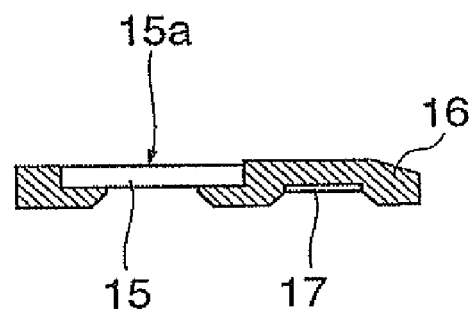

Further, although in the above-described embodiment, the reference member 17 is provided on the original conveying surface of the contact glass 15, this is not limitative. More specifically, the reference member 17 can be disposed at any location on the contact glass 15 or on the glass holding member 16 insofar as it is off the original image reading location 15a. For example, as shown in FIG. 10A, the reference member 17 may be disposed on the opposite side of the contact glass 15 from the original conveying surface thereof. Alternatively, the reference member 17 may be disposed on the original conveying surface of the glass holding member 16 as shown in FIG. 10B, or on the opposite side of the glass holding member 16 from the original conveying surface of the same as shown in FIG. 10C. In the case shown in FIG. 10B, the line image sensor 11 has to move over a junction part 16a connecting between the contact glass 15 and the reference member 17, which increases the distance of travel of the line image sensor 11. Therefore, the junction part 16a may be omitted as shown in FIG. 10D.

Figure 10D:
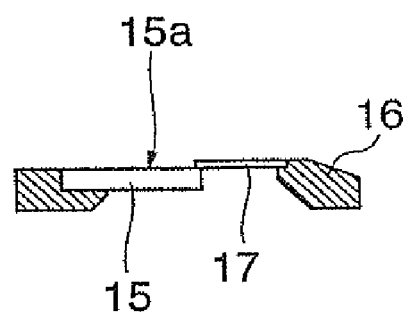

The reference member 17 disposed as shown in FIGS. 10B and 10D requires sufficient strength and thickness for preventing the white reference surface thereof from being damaged by conveyed originals D. In the cases shown in FIGS. 10A and 10C, the white reference surface of the reference member 17 and the upper surface of the contact glass 15 as the surface for reading originals D are different in location from each other, and hence it is desirable to select a thickness of the contact glass 15 and a shape of the glass holding member 16 such that the surfaces of the two are both brought into focus. This is because one of unevenesses which must be corrected by shading correction is variation in the amount of light from a rod lens array (not shown), but the profile of the variation in the light amount (i.e. light amount distribution profile) becomes different in a position away from a position in focus, which makes the shading correction inaccurate. When the variation in the amount of light from the rod lens array is small, the reference member reading operation can be performed in a position out of focus.

In the cases in FIGS. 10A and 10D as well, insofar as the line image sensor 11 can be eventually moved between the position opposed to the reference member 17 and the position not opposed to the reference member 17, it doesn't matter whether the line image sensor 11, the reference member 17, the glass holding member 16 or the like moves in the vertical direction or any other direction, or even perform rotation in the course of travel. Further, in the cases in FIGS. 10A and 10D, the white reference surface of the reference member 17 is exposed to the inner side of the image reading unit 61 (62), and therefore there is no fear of the white reference surface being damaged or paper powder or dust being deposited on the white reference surface.

Although in the above-described embodiment, the sloping surface part 19c is formed on the pushing member 19 so as to prevent the protruding portion 18x of the slide cam 18 from being broken when the apparatus 1 is opened during the reference member reading period, this is not limitative, but in another embodiment, the image reading apparatus 1 may be configured such that when the apparatus 1 is opened/closed during the reference member reading period, the opening/closing of the apparatus 1 is detected, and the pulse motor 21 is caused to rotate to bring the pushing member 19 into the state shown in FIG. 5A, thereby preventing breakage of the protruding portion 18x.

Detect means for detecting the opening/closing of the apparatus 1 may be implemented by any type of detector, including a microswitch, a photo-detector switch, and a magnetic detector switch. Alternatively, determination as to the opening/closing of the apparatus 1 may be performed by detecting that the read output from the line image sensor 11 has assumed a value quite different from one in the normal state. It is also possible to use a control means implemented e.g. by the CPU or a combination of the control means and a special-purpose electric circuit as a detect means for detecting the opening/closing of the apparatus 1.

Further, although in the above-described embodiment, the image reading apparatus is capable of double-sided reading of an original D, it is to be understood that the present invention can be applied to an image reading apparatus for single-sided reading.

Figure 11:
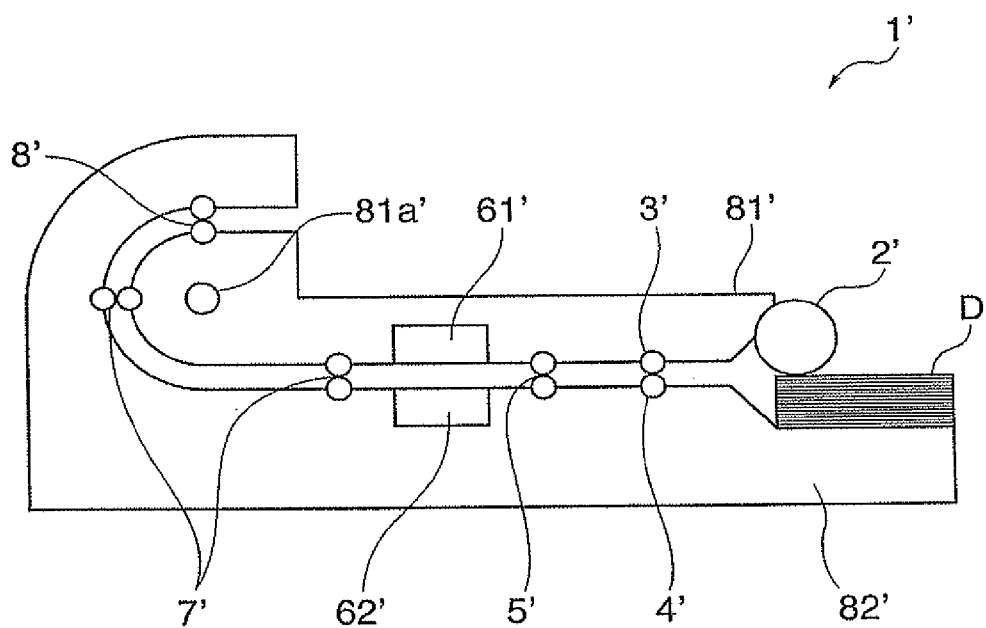
FIG. 11 is a schematic view of an image reading apparatus according to a second embodiment of the present invention.

FIG. 11 is a schematic view of an image reading apparatus according to a second embodiment of the present invention. The arrangement of the image reading apparatus in FIG. 11 is illustrated by way of example, and hence this is not limitative.

As shown in FIG. 11, the image reading apparatus 1' is comprised of a pickup roller 2' that picks up originals D, a feed roller 3' that feeds the originals D picked up by the pickup roller 2' into the apparatus 1', a retard roller 4' that pairs with the feed roller 3' to separate the picked-up originals D one by one, a registration roller pair 5' for conveying the originals D while correcting skew of ones conveyed thereto in a skewed state, a pair of image reading units 61' and 62' that read images on the respective upper and lower surfaces of each of the originals D, convey roller pairs 7' that further convey the originals D, and a discharge roller pair 8' that discharges the originals D out of the apparatus. It should be noted that the image reading units 61' and 62' may be disposed at respective different locations in the original conveying direction instead of being disposed at the same location as shown in FIG. 11.

The image reading apparatus 1' is divided into an upper frame 81' and a lower frame 82' by a conveying path along which originals D are conveyed. This construction makes it possible to open the conveying path by rotating the upper frame 81' around a pivot shaft 81a' manually when jamming of a original D has occurred in the image reading apparatus 1' during conveyance thereof, and take out the jammed original from the conveying path.

In the following embodiment, each of the two image reading units 61' and 62' reads images on respective originals conveyed, one by one, by the associated line image sensor in an original reading position. However, the present invention is not limited to the present embodiment insofar as the apparatus is, provided with at least one image reading means requiring shading correction.

Figure 12:
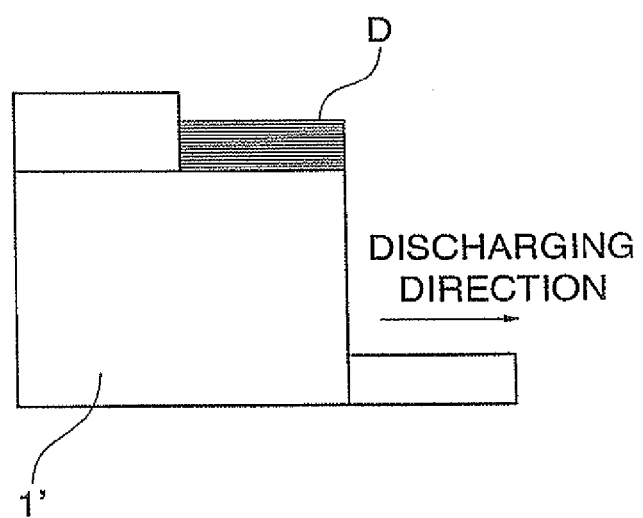
FIG. 12 is a schematic view of a variation of the image reading apparatus in FIG. 11.
Figure 13:
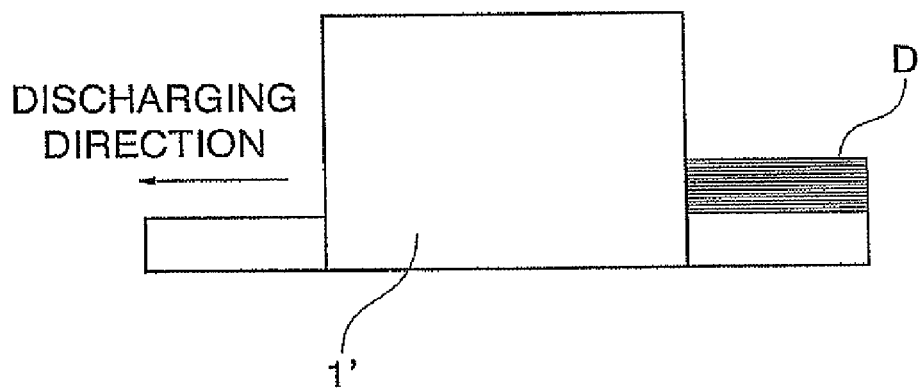
FIG. 13 is a schematic view of another variation of the image reading apparatus in FIG. 11.

Further, in the following embodiment, the height of an original discharging position with respect to an original stack position is not particularly limited. For example, the original discharging position may be provided below the original stack position as shown in FIG. 12, or alternatively on the opposite side of the image reading apparatus 1' from the original stack position as shown in FIG. 13. Further, although in FIG. 11, each original is passed between the image reading units 61' and 62' by horizontally moving the original therethrough, the image reading apparatus 1' may be configured such that original D is passed between the image reading units 61' and 62' by vertically moving the original D therethrough.

Figure 14:
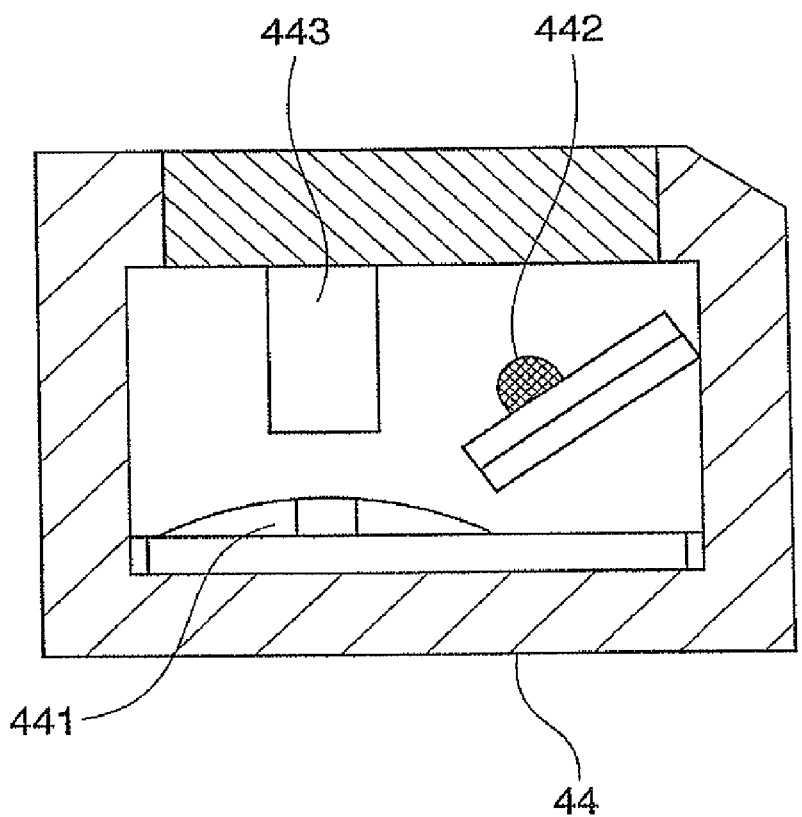
FIG. 14 is a schematic view of a line image sensor provided in an image reading unit appearing in FIG. 11.

FIG. 14 is a schematic view of a line image sensor 44 provided in the image reading unit 62' appearing in FIG. 11.

It should be noted that the image reading unit 61' is identical in construction to the image reading unit 62' except that the image reading unit 61' reads not an image on the lower surface of the original D but an image on the upper surface of the same, and hence description thereof is omitted.

As shown in FIG. 14, the line image sensor 44 incorporates an LED 442 as a light source, a lens array 443, and a light receiving element 441.

In reading an original, the line image sensor 44 causes reflected light from the original illuminated by the LED 442 to form an image on the light receiving element 441 by the lens array 443 and converts the image into an electric signal to thereby generate an image reading signal.

Next, a description will be given of the arrangement and configuration of the image reading unit 62'.

Figure 15A:
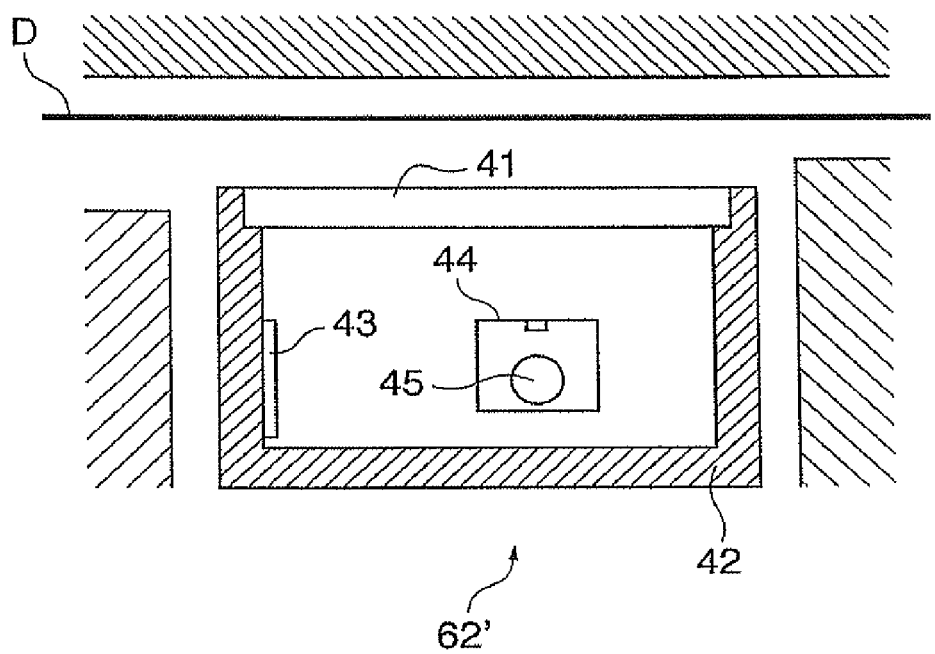
Figure 15B:
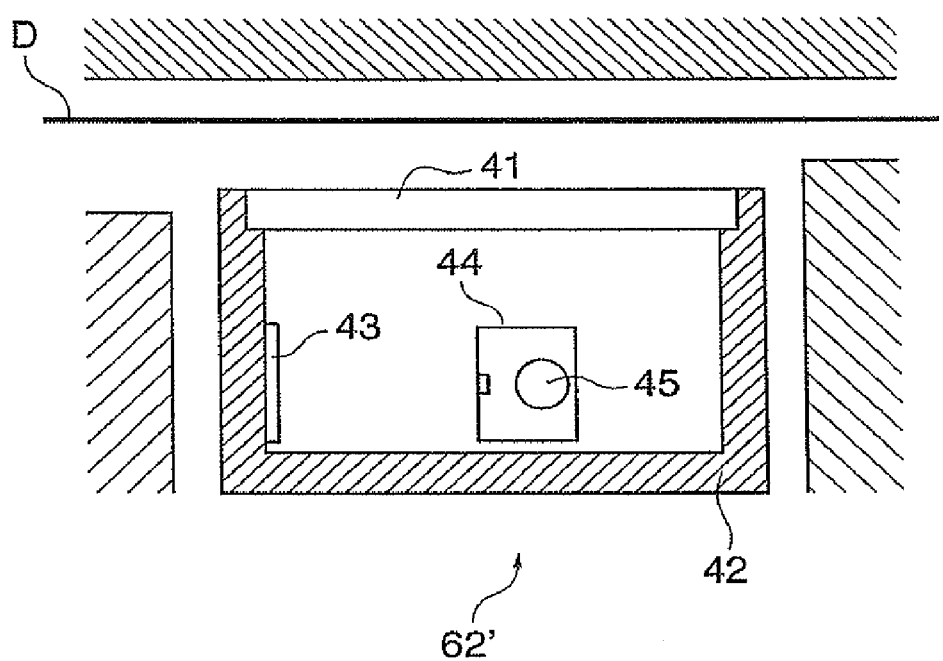

FIGS. 15A and 15B are cross-sectional views showing the image reading unit 62' and its surrounding in this embodiment, in which FIG. 15A shows a state during the original reading period, and FIG. 15B shows a state during a shading correction data acquisition period.

As shown in FIGS. 15A and 15B, the image reading unit 62' has a frame 42 that has an opening formed on a side thereof along which an original D is conveyed, i.e. an upper side thereof, and pivotally supports a pivot shaft 45 of the line image sensor 44 accommodated therein. The image reading unit 62' is further comprised of a contact glass 41 fitted in the opening of the frame 42, for guiding the original D to the original reading location, and a white reference member 43 for shading correction (hereinafter simply referred to as "the white reference member 43) disposed within the frame 42. This arrangement makes it possible to prevent paper powder and the like dust deposited on an original D conveyed to the upper surface of the contact glass 41, i.e. the outer side of the frame 42, from contaminating the internal space of the frame 42 and attaching it to the white reference member 43. Further, the arrangement makes it possible to carry out a shading correction process, described in detail hereinafter, accurately without necessitating cleaning of the white reference member 43.

The white reference member 43 is disposed such that when the line image sensor 44 is rotated through 90°, the reference surface of the white reference member 43 faces a reading position of the line image sensor 44.

The line image sensor 44 is disposed such that the distance from the line image sensor 44 to the white reference member 43 during the shading correction data acquisition period (see FIG. 15B) becomes equal to an optical distance from the line image sensor 44 to the surface of an original D (i.e. a distance corrected in view of the glass thickness of the contact glass 15 disposed between the line image sensor 44 and the surface of the original D) in the original image reading period (see FIG. 15A). This is to equalize the reading conditions of the line image sensor 44, i.e. the focal position and the amount of illuminating light, between during the original image reading period and during the shading correction data period.

Alternatively, the difference in the amount of reflected light due to the difference in the optical distance may be corrected, instead of disposing the line image sensor 44 such that the optical distance is equalized as described above. Reading of the reference member 43 can be performed even in a position out of focus, and therefore it is assumed that the reading position includes positions deviated from the position in focus.

Figure 16:
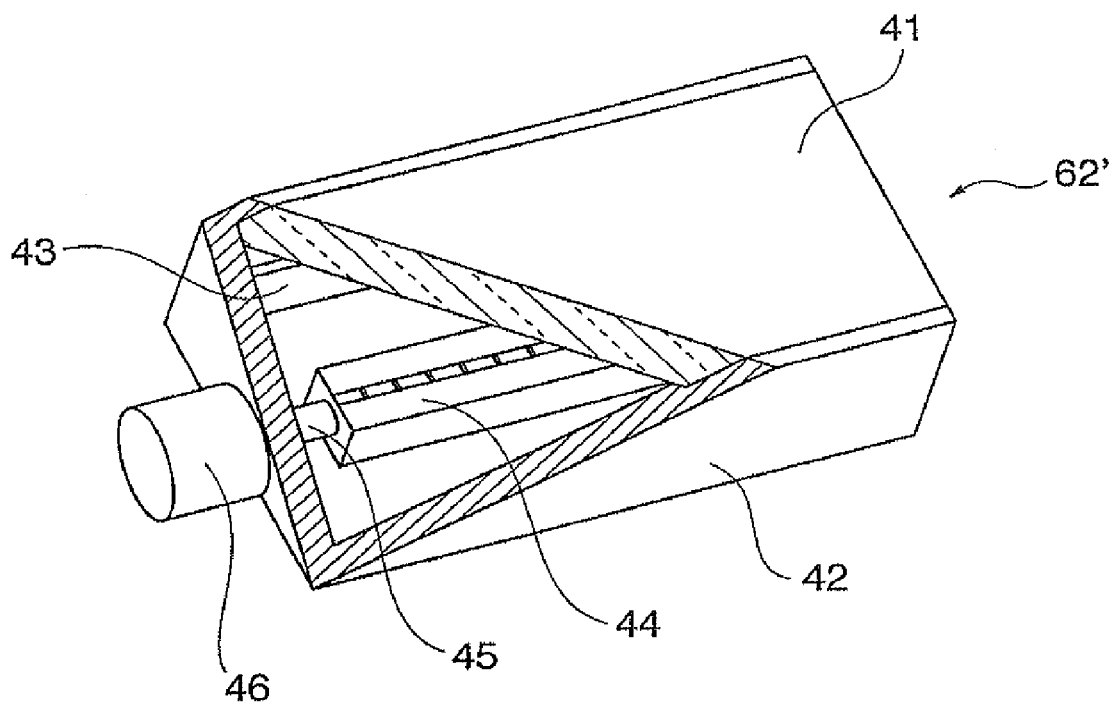
FIG. 16 is a perspective view of the image reading unit.

FIG. 16 is a perspective view of the image reading unit 62'.

As shown in FIG. 16, the image reading unit 62' has a sensor rotating mechanism comprised of the pivot shaft 45 and a motor 46, and is capable of rotating the reading position of the line image sensor 44 through a desired angle. The sensor rotating mechanism may include a transmission mechanism comprised of gears or the like. Further, the motor 46 may be replaced by a solenoid, a rotary solenoid, or the like actuator.

Figure 17:
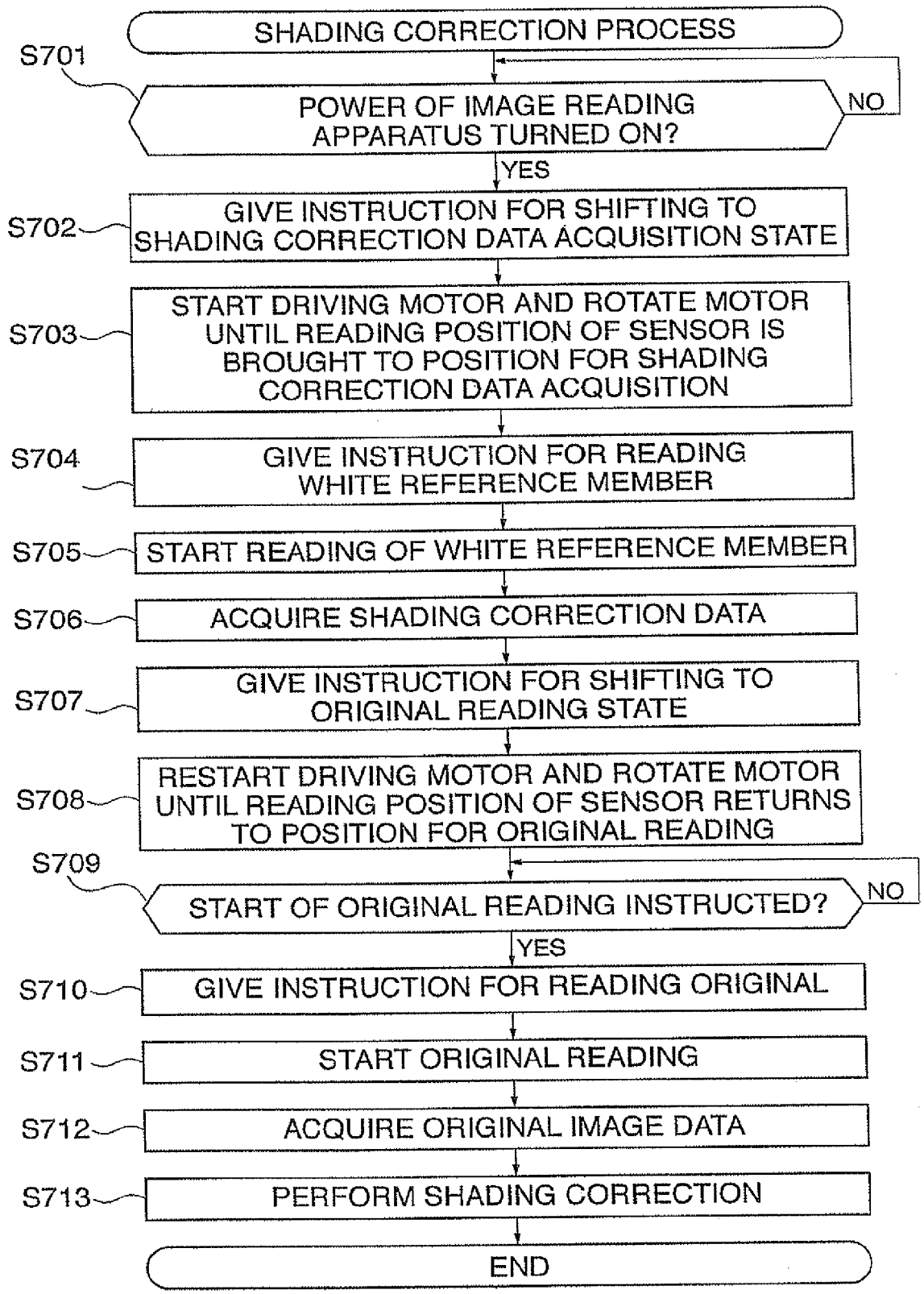
FIG. 17 is a flowchart of a shading correction process executed by a CPU.

FIG. 17 is a flowchart showing the shading correction process executed by the CPU.

As shown in FIG. 17, first, when a control means, not shown, detects that a power switch, not shown, of the image reading apparatus 1' has been pressed by the user, it turns on the power supply to the electrical sections and components of the apparatus. When the power supply is turned on (YES to a step S701), a motor control section, not shown, drives the motor 46 to rotate the line image sensor 44 into a state for acquisition of shading correction data (step S702). When supplied with a driving current, the motor 46 starts rotation to rotate the line image sensor 44 until the reading position of the line image sensor 44 reaches the position for shading correction data acquisition (step S703).

Then, a sensor control section, not shown, delivers to the line image sensor 44 a control signal for causing the line image sensor 44 to read the white reference member 43 (step S704). In response to this control signal, the line image sensor 44 starts reading the white reference member 43, and generates a reading signal through the reading operation (step S705). The sensor control section converts the reading signal into digital data at an A/D converter section, not shown, to thereby acquire the digital data as shading correction data for each pixel corresponding to each elements of the light receiving element 441 (step S706). The shading correction data may be obtained by performing some computation on the digital data generated through the A/D conversion.

When acquisition of the shading correction data is completed, the motor control section drives the motor 46 to rotate the line image sensor 44 into a state for reading of an original (step S707). When supplied with a driving current, the motor 46 resumes the rotation to rotate the line image sensor 44 until the reading position of the line image sensor 44 returns to the position for original reading (step S708).

Then, when an instruction for starting original reading is input by the user (YES to a step S709), the sensor control section delivers to the line image sensor 44 a control signal for causing the line image sensor 44 to sequentially read conveyed originals (step S710). Upon reception of this control signal, the line image sensor 44 starts reading the originals, and sequentially generates reading signals by reading images on the respective originals D (step S711). The sensor control section converts the reading signals into digital data at the A/D converter section, not shown, to thereby acquire the digital data as original image data (step S712).

When acquisition of original image data from entire surface of one original D to be read in response to the reading instruction from the user is completed, shading correction is performed on the original image data based on the acquired shading correction data (step S713), followed by terminating the present process. It should be noted that the shading correction data acquisition process may be started before reading of all the originals to be scanned is completed.

According to the present process, first, the line image sensor 44 is rotated until the reading position thereof reaches the position for shading correction data acquisition (step S703), and acquires shading correction data by reading the white reference member 43 (step S706). Thereafter, the line image sensor 44 is rotated until the reading position thereof returns to the position for original reading (step S711), and reads originals D (step S711). This makes it possible to achieve accurate shading correction.

Figure 18A:
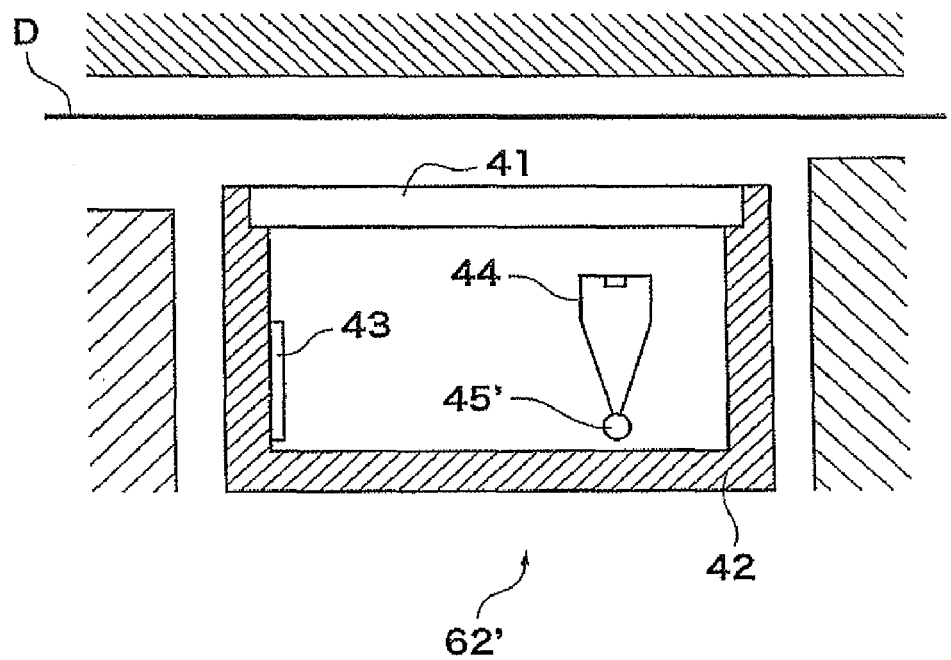
Figure 18B:
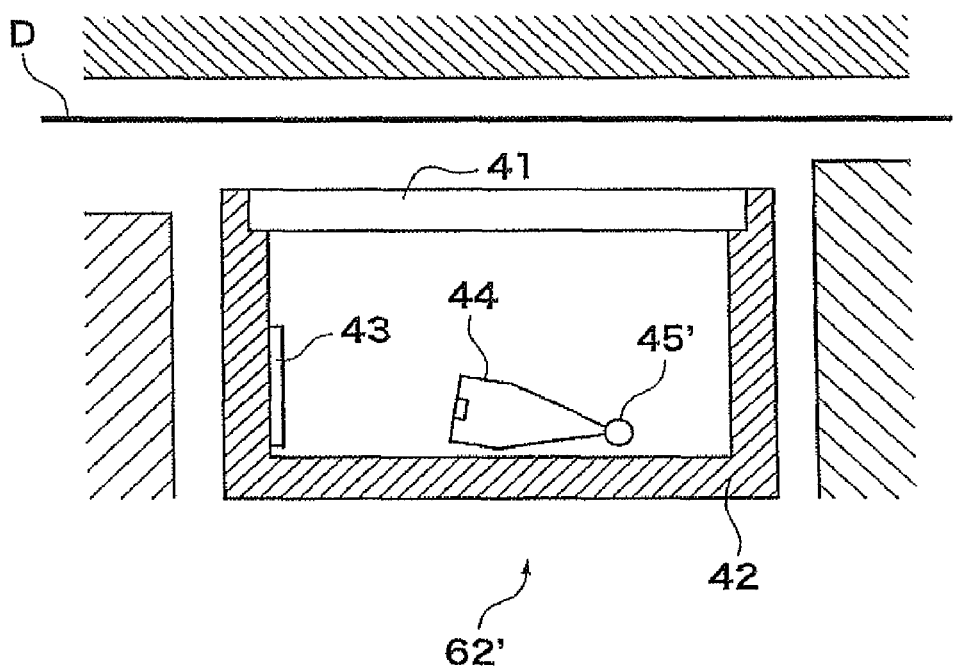

It should be noted, as shown in FIGS. 18A and 18B, that the sensor rotating mechanism may have a pivot shaft 45' having a pivotal axis thereof positioned apart from the longitudinal axis of the line image sensor 44, in place of the pivot shaft 45 having a pivotal axis thereof positioned close to the longitudinal axis of the line image sensor 44. This makes it possible to swing the line image sensor 44 about the pivot shaft 45'.

As described above, according to the present embodiment, the line image sensor 44 is configured to perform rotation or swing motion without performing linear motion. This makes the movement range of the line image sensor 44 smaller than that in a case where the line image sensor 44 is configured to perform linear motion, and hence it is possible to reduce the size of the image reading unit 62'. Further, the pivotal axis exists as fixed points of the line image sensor 44, so that by leading a signal line from an area close to the fixed point, it is possible to prevent occurrence of a trouble due to a disconnection as a problem to be solved when using such an apparatus that has a cable led out from the movable part thereof.

Figure 19:
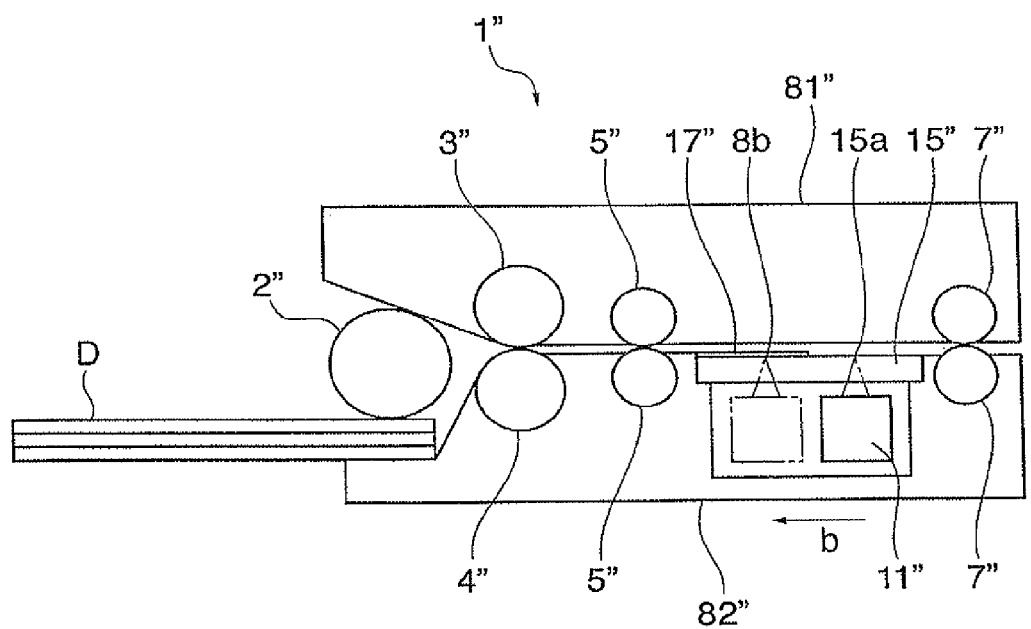
FIG. 19 is a schematic side view of an image reading apparatus according to a third embodiment of the present invention.

FIG. 19 is a schematic side view of an image reading apparatus according to a third embodiment of the present invention. It should be noted that the arrangement of the image reading apparatus in FIG. 19 is schematically illustrated by way of example, and hence this is not limitative.

As shown in FIG. 19, the image reading apparatus 1" is comprised of a pickup roller 2" that picks up originals D, a feed roller 3" that feeds the originals D picked up by the pickup roller 2" into the apparatus 1", a retard roller 4" that separates the picked-up originals D one by one, a registration roller pair 5" provided for conveying the originals D, a contact glass 15" for guiding each original D to an image reading location 15a on an original conveying surface thereof, a reference member 17" provided as a white reference in a reference member reading location 8b on the original conveying surface of the contact glass 15", and a line image sensor 11" that reads image information on the original D through the contact glass 15". Further, the image reading apparatus 1" has a convey roller pair 7" disposed downstream of the line image sensor 11".

The image reading apparatus 1" is formed by an upper frame 81" and a lower frame 82", and the line image sensor 11" is supported in the lower frame 82" in a manner movable between the image reading location 15a and the reference member reading location 8b.

With the above-described arrangement, the image reading apparatus 1" performs the following operation for reading images on respective original D. First, before starting reading of the originals D, the image reading apparatus 1" causes a drive mechanism, not shown, to move the line image sensor 11" in a direction indicated by an arrow b from a position opposed to the image reading location 15a, and reads the reference member 17" by the line image sensor 11" through the contact glass 15" when the line image sensor 11" is brought to a position opposed to the reference member reading location 8b. A portion of the lower surface of the reference member 17" corresponding to the reference member reading location 8b and the vicinity of the portion provide the reference surface. Shading correction data generated based on an output from the line image sensor 11" having read the reference member 17" is stored on a pixel-by-pixel basis. Thereafter, the image reading apparatus 1" causes the drive mechanism, not shown, to return the line image sensor 11" to the home position i.e. the image reading location 15a.

After the above-described operation is completed, the image reading apparatus 1" takes in the originals D by the pickup roller 2" and the feed roller 3", and separates the originals D, one by one, by the retard roller 4". While being nipped and conveyed (sub-scanned) by the registration roller pair 5 and the convey roller pair 7, each original D has image information on its lower surface read by the line image sensor 11" in a main scanning direction (i.e. in a direction substantially orthogonal to the original conveying direction). During the image reading operation, image data generated based on an output from the line image sensor 11" is subjected to shading correction with reference to the aforementioned shading correction data. After image reading is completed, the original D which nipped and conveyed by the convey roller pair 7" is discharged out of the apparatus 1".

Figure 20:
FIG. 20 is a schematic side view of a reference member appearing in FIG. 19.

FIG. 20 is a schematic side view of the reference member 17" appearing in FIG. 19.

As shown in FIG. 20, the reference member 17" is comprised of a white film 71 formed on the original conveying surface of the contact glass 15" by silk printing (a kind of coating method) and a tape member (adhesive tape) 72 having one adhesive face and affixed to the upper surface of the white film 71 so as to prevent the white film 71 from being worn by contact with conveyed originals D.

For the tape member 72, there is used a member which looks white as viewed from the adhesive-face side. When a light source incorporated in the line image sensor 11" irradiates light onto the white film 71 through the contact glass 15", the tape member 72 reflects only light having passed through the white film 71. This makes the white film 71 of the reference member 17", as viewed through the contact glass 15" from the side of the line image sensor 11", look even whiter, thereby reducing variations in whiteness (variations within the member itself as well as between individual units thereof). As a consequence, the whiteness of the reference member 17" becomes uniform.

Although in the above-described embodiment, the white film 71 is formed on the surface of the contact glass 15" by silk printing, other methods, such as painting or spray painting (also included in coating method), may be employed to form the white film 71 on the surface of the contact glass 15". The contact glass 15" may be subjected to surface processing e.g. for roughening the surface of the contact glass 15" so as to obtain excellent adhesion of the white film 71 to the contact glass 15".

Figure 21:
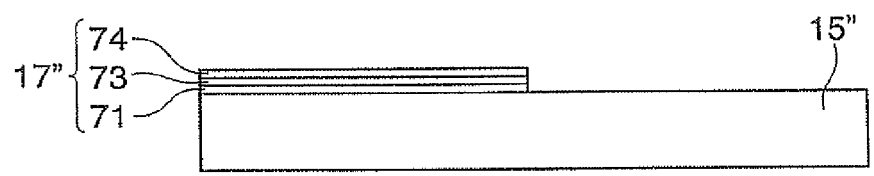
FIG. 21 is a schematic side view of a variation of the reference member in FIG. 20.
Figure 22:
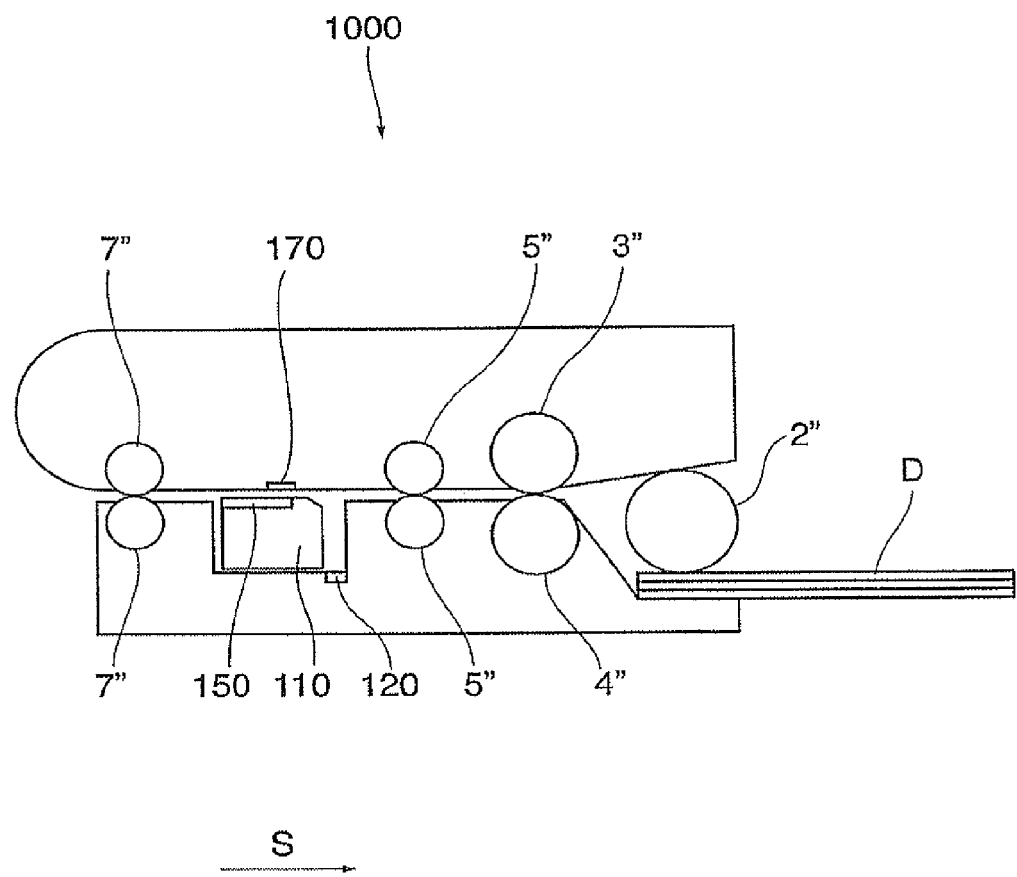
FIG. 22 is a side view showing the internal construction of a conventional image reading apparatus.
Figure 23:
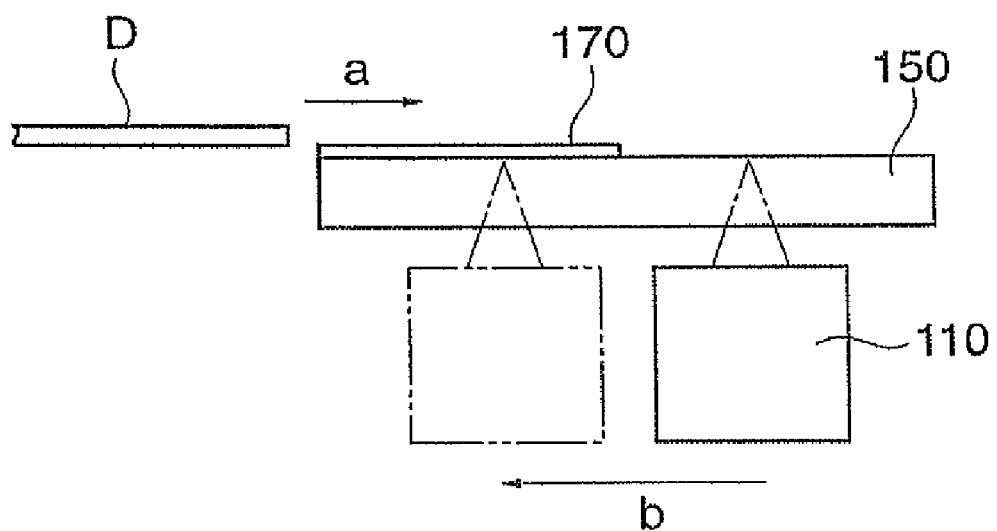
FIG. 23 is a schematic side view of an image reading unit of the conventional image reading apparatus.

Although in the above-described embodiment, the reference member 17" is formed by affixing the white tape member 72 to the white film 71, it suffices that the color of the tape member 72 is substantially white. Further, as shown in FIG. 21, the reference member 17" may be formed by affixing a sheet form member 74 as a protective member to the white film 71 using a double-sided adhesive tape 73. In this case, when the sheet form member 74 is substantially white, a transparent or white double-sided adhesive tape 73 is used, and when the sheet form member 74 has a color other than white, a substantially white double-sided adhesive tape 73 is used.

The sheet form member 74 may be bonded to the white film 71 by an adhesive. In this case, however, it is required to use a substantially white sheet form member 74 so as to reduce the influence of non-uniform application of the substantially white adhesive. And transparent adhesive also require to use substantially white sheet form member 74.

The sheet form member 74 may be formed by a member of sheet metal, such as stainless, so as to suppress wear of the sheet form member 74 due to rubbing with originals. When a sheet metal member having a sufficient thickness is used, the sheet metal member is fixed to a member other than the contact glass 15", and hence it is not required to affix or bond the sheet form member 74 to the white film 71. In this case, it is more suitable if the lower surface of the sheet metal is machined so as to cause diffuse reflection of light. Further, a substantially white sheet or film may be provided on the lower surface of the sheet metal. Even when a sheet metal is laid on a white film, as mentioned above, and no affixing or bonding to the white film is effected, the combination of the white film and the sheet metal should be considered to be included in the category of the reference member 17".

The sheet form member 74 may be fixed by affixing the double-sided adhesive tape 73 to a portion of the white film 71 or the contact glass 15" around the vicinity of the reference member reading location 15a without affixing the double-sided adhesive tape 73 to the white film 71 in the vicinity of the reference member reading location 15a. In this case, the double-sided adhesive tape 73 can have any color. Further, the protective member, such as the metal plate or the sheet metal member, is not required to cover the whole of the white film 71, but it suffices that the protective member covers at least a portion thereof corresponding to reading position of the line image sensor 11" in the reference member reading position.

Although in the above-described embodiment, the line image sensor 11" is movable, the image reading apparatus 1" may be configured such that the line image sensor 11" is fixed and the contact glass is movable, or both can be moved.

Further, the present invention can also be applied to a flat bed scanner provided with an original conveying function.

Furthermore, the image reading apparatus 1" may be configured such that the line image sensor 11" can move its reading position not by transition or parallel displacement but by performing rotation or other motion.

It is to be understood that the object of the present invention may also be accomplished by supplying a system or an apparatus with a storage medium in which a program code of software, which realizes the functions of either of the above described embodiments is stored, and causing a computer (or CPU or MPU) of the system or apparatus to read out and execute the program code stored in the storage medium.

In this case, the program code itself read from the storage medium realizes the functions of either of the above described embodiments, and therefore the program code and the storage medium in which the program code is stored constitute the present invention.

Examples of the storage medium for supplying the program code include a floppy (registered trademark) disk, a hard disk, a magnetic-optical disk, a CD-ROM, a CD-R, a CD-RW, a DVD-ROM, a DVD-RAM, a DVD-RW, a DVD+RW, a magnetic tape, a nonvolatile memory card, and a ROM. Alternatively, the program may be downloaded via a network.

Further, it is to be understood that the functions of either of the above described embodiments may be accomplished not only by executing the program code read out by a computer, but also by causing an OS (operating system) or the like which operates on the computer to perform a part or all of the actual operations based on instructions of the program code.

Further, it is to be understood that the functions of either of the above described embodiments may be accomplished by writing a program code read out from the storage medium into a memory provided on an expansion board inserted into a computer or a memory provided in an expansion unit connected to the computer and then causing a CPU or the like provided in the expansion board or the expansion unit to perform a part or all of the actual operations based on instructions of the program code.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Applications Nos. 2006-79434 filed Mar. 22, 2006, 2006-79437 filed Mar. 22, 2006, and 2006-251041 filed Sep. 15, 2006, which are hereby incorporated by reference herein in their entirety.

What is claimed is:

1. An image reading apparatus for reading an image formed on an original, while conveying the original, comprising:
   a contact glass having an original conveying surface on which an original reading position is defined and on which the original is guided;
   an image sensor configured for movement of a reading position thereof between a position opposed to the original reading position and a position opposed to a reference member reading position, and configured to read, through said contact glass, the image formed on the original guided on the original conveying surface; and
   a shading correction reference member as a white reference for said image sensor,
   wherein said shading correction reference member comprises a white film formed on an original conveying path-side surface of said contact glass by a printing method or a coating method, and an original contact preventing member for preventing said white film from being worn by contact with a conveyed original, and
   wherein said original contact preventing member and said white film are fixed to each other using a substantially white fixing member, which makes said white film look even whiter as viewed through said contact glass from the side of said image sensor.

2. An image reading apparatus according to claim 1, wherein said substantially white fixing member is a substantially white adhesive.

3. An image reading apparatus according to claim 1, wherein said substantially white fixing member is substantially white sheet form member, and wherein using one of a transparent adhesive and a substantially white adhesive, said original contact preventing member and said white film are fixed to each other via said substantially white sheet form member.

4. An image reading apparatus for reading an image formed on an original, while conveying the original, comprising:
   a contact glass having an original conveying surface on which an original reading position is defined and on which the original is guided;
   an image sensor configured for movement of a reading position thereof between a position opposed to the original reading position and a position opposed to a reference member reading position, and configured to read, through said contact glass, the image formed on the original guided on the original conveying surface; and
   a shading correction reference member as a white reference for said image sensor,
   wherein said shading correction reference member comprises a white film formed on an original conveying path-side surface of said contact glass by a printing method or a coating method, and an original contact preventing member for preventing said white film from being worn by contact with a conveyed original, and
   wherein a white film-side surface of said original contact preventing member is substantially white, which makes said white film look even whiter as viewed through said contact glass from the side of said image sensor, and said original contact preventing member and said white film are fixed to each other using a transparent adhesive.

5. An image reading apparatus according to claim 4, wherein said original contact preventing member is a sheet metal member.

6. An image reading apparatus according to claim 4, wherein said original contact protective member is fixed to at least one of a portion of said white film and a portion of said contact glass, other than a portion close to said reference member reading position.

7. An image reading apparatus according to claim 1, wherein said original contact preventing member is a sheet metal member.

8. An image reading apparatus according to claim 1, wherein said original contact protective member is fixed to at least one of a portion of said white film and a portion of said contact glass, other than a portion close to said reference member reading position.

* * * * *